US006424449B1

United States Patent
Namiki

(10) Patent No.: US 6,424,449 B1
(45) Date of Patent: Jul. 23, 2002

(54) OPTICAL INFORMATION PROCESSING APPARATUS FOR IMAGE PROCESSING USING A REFLECTION TYPE SPATIAL LIGHT MODULATOR

(75) Inventor: Mitsuru Namiki, Hanno (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/552,379

(22) Filed: Apr. 19, 2000

(30) Foreign Application Priority Data

Apr. 19, 1999 (JP) .......................................... 11-110830
Nov. 12, 1999 (JP) .......................................... 11-322496

(51) Int. Cl.⁷ ............................. G02F 1/03; G02B 27/46
(52) U.S. Cl. ..................... 359/247; 359/559; 359/560; 359/561
(58) Field of Search ................................ 250/216, 550; 382/211; 359/246, 247, 629, 559, 560, 561

(56) References Cited

U.S. PATENT DOCUMENTS 5,418,380 A  5/1995  Simon et al. ................ 250/550

FOREIGN PATENT DOCUMENTS

JP  5-88079  4/1993  .......... G02B/13/00
JP  07244257 A  * 9/1995  ......... G02B/027/46

\* cited by examiner

Primary Examiner—Georgia Epps
Assistant Examiner—David N. Spector
(74) Attorney, Agent, or Firm—Scully, Scott Murphy & Presser

(57) ABSTRACT

A collimator optical system collimates light from the coherent light source. A reflection type spatial light modulator returns collimated light from the collimator optical system to the collimator optical system. A Fourier transformation optical system Fourier-transforms light from the reflection type spatial light modulator and shares at least partial optical system with the collimator optical system. An emission light from another coherent light source passes through an incident light path composed of another collimator optical system, spatial modulator and polarized beam splitter in this order and reaches the reflection type spatial light modulator. Then, a reflection light from the reflection type spatial light modulator passes through a reflection light path which is reverse to the incident light path and reaches a polarized beam splitter. That is, the incident light path and reflection light path are split by the polarized beam splitter. Then, a shared optical system which is at least part of Fourier transformation optical system for the incident light and further at least part of reversed Fourier transformation optical system for the reflection light is disposed in optical path between the polarized beam splitter and reflection type spatial light modulator.

26 Claims, 12 Drawing Sheets

OPTICAL INFORMATION PROCESSING APPARATUS FOR IMAGE PROCESSING USING A REFLECTION TYPE SPATIAL LIGHT MODULATOR

CROSS-REFERENCE TO RELATED APPLICATIONS

This application is based upon and claims the benefit of priority from the prior Japanese Patent Applications No. 11-110830, filed Apr. 19, 1999; and No. 11-322496, filed Nov. 12, 1999, the entire contents of which are incorporated herein by reference.

BACKGROUND OF THE INVENTION

The present invention relates to an optical information processing apparatus for carrying out image processing or image recognition using a reflection type spatial light modulator, for example, and more particularly to an optical information processing apparatus having a simplified and compact structure achieved by improving an optical system for use therein.

Further, the present invention relates to an optical information processing apparatus and more particularly, an optical information processing apparatus for optically carrying out image processing or image recognition using a reflection type spatial light modulator (hereinafter referred to as SLM) for filter display.

As well known, two-dimensional image Fourier transformation which requires a large amount of computation can be achieved rapidly by means of a single lens if optical means is used. Thus, since before, various researches on rapid optical information processing such as correlation, convolution, filtering and the like have been carried out.

FIG. 16 shows an example of general optical information processing apparatus optical system.

That is, as shown in FIG. 16, light emitted from a coherent light source 10 is condensed by a condensing lens 11, is focused on a spatial filter 12, and is filtered. Then the filtered light arrives to a collimator lens group 13 and is collimated. The collimated light arrives to a transmission type light modulator 14T in which the input image 141 is displayed and is modulated. The modulated light arrives to a Fourier transformation lens group 15, is Fourier transformed, and forms a Fourier transformation image 161 of the input image 141 on the rear focal plane (FB plane) of the Fourier transformation lens group 15. A filter 16 is provided on the rear focal plane of the Fourier transformation lens group 15 to process optical information of the Fourier transformation image 161 of the input image 141.

A Fourier inverse transformation lens group 17 is provided in a manner that a front focal plane (IEF) of the Fourier inverse transformation lens 17 locates on the filter 16. The light that passes filter 16 arrives to the Fourier inverse transformation lens 17 and is Fourier inverse transformed. Finally, the Fourier inverse transformed light arrives at an images pickup device 18 placed on the rear focal plane (IFB) of the Fourier inverse transformation lens 17. The processed result of image 181 is obtained by the image pickup device 18. Thus, the input image 141 is Fourier transformed, filtered, Fourier inverse transformed, and picked up.

FIG. 16 shows an opening as the input image 141 and indicates an example of processing for carrying out bypass filtering for its Fourier transformation image 161.

In this case, the Fourier transformation image 161 of the input image 141 is subjected to filtering by a filter 16 having a ring-like opening for extracting only high frequency components apart from the center thereof and consequently, the processing result image 181 whose boundary is emphasized is obtained on the image pickup device 18.

FIGS. 17, 18 show conventional cases where an input image is displayed on the reflection type spatial light modulator.

The optical information processing apparatus optical system shown in FIG. 17 includes a reflection type spatial light modulator 14R, a Fourier transformation lens group 15, a filter 16, a Fourier inverse transformation lens 17, an image pickup device 18. This optical information processing apparatus operates as the apparatus shown in FIG. 16.

Its structure is different from that in FIG. 16 in that a polarized beam splitter 19 is added to use the reflection type spatial light modulator 14R as a spatial light modulator.

This polarized beam splitter 19 allows P-polarized light (light polarized in parallel to paper surface, indicated by both end arrows in FIG. 17) to pass and reflects S-polarized light (light polarized to a plane perpendicular to paper surface, indicated by a symbol indicating a perpendicular direction in FIG. 17).

If collimated light just after it is emitted from the collimator lens group 13 is modulated to S-polarized light, it is reflected by a PBS plane 191 and then impinges upon the reflection type spatial light modulator 14R.

The reflection type spatial light modulator 14R expresses respective pixel values of an indicated input image 141 with an orientation direction of liquid crystal molecules in each pixel.

As a result, the entered collimator light is modulated so that its P-polarized light component is enlarged depending on the pixel value at the time of reflection.

That is, S-polarized light and P-polarized light are mixed in beam of light just after it is reflected by the reflection type spatial light modulator 14R.

When light in which S-polarized light and P-polarized light are mixed reaches the plane 191 of the polarized beam splitter 19, only the P-polarized light passes through. Consequently, the Fourier transformation image 161 of the input image 141 is generated on the FB plane at the rear focal plane of the Fourier transformation lens group 15.

A structure after the filter 16 is the same as shown in FIG. 16, so that finally, the processing result image 181 is obtained on the FF plane.

A disposition shown in FIG. 18 also produces the same function.

In this case, collimated light emitted from the collimator lens group 13 is modulated to P-polarized light and light for reading the input image 141 written in the reflection type spatial light modulator 14R is modulated to S-polarized light.

Because the conventional optical information processing apparatus optical system shown in FIGS. 17, 18 has a structure redundant in the axial direction, if considering its practical performance, it is important to achieve as compact a structure as possible, and further a high performance Fourier transformation lens group is required to increase the capacity of the image.

For example, Jpn. Pat. Appln. KOKAI Publication No. 5-88079 has disclosed a design example of a Fourier transformation lens group comprised of three groups whose power is distributed to positive, negative and positive as shown in FIG. 19.

A first group 151 is composed of cemented lens having positive power, a second group 152 is comprised of two meniscus lenses having negative power and a third group 153 is comprised of two meniscus lenses having positive power.

In this design example, by replacing the front main plane HF and rear main plane HB of the Fourier transformation lens group, a distance between the front focal plane FF and rear focal plane FB is 1.25f-less than 2f. In an optical information processing apparatus optical system using this, a length in the axial direction is short.

Although pixel size of the spatial light modulator has been decreased with a progress of technology, because the capacity of a handled image has increased, a display area size of a spatial light modulator having one million pixels, for example, is relatively large.

To illuminate this region with a uniform intensity, a lens having a high NA or a lens having a low NA but a long focal distance is required for the collimator lens group.

Because the focal distance is decreased if such a high NA collimator lens group is applied, apparently a distance in the axial direction required from the front focal plane up to a position in which a collimator light is obtained is thought to be decreased.

However, in this case, optical performance demanded for the collimator lens group becomes very high.

This results in increasing the number of the lens elements of the collimator lens group and the distance from the front focal plane CF of the collimator lens group up to a position in which the collimator light is obtained is not always decreased.

If a high NA collimator lens group is applied, an opening size of the spatial filter is desired to be small. In such a case, it is necessary to provide a portion containing the spatial filter with a high precision alignment mechanism.

This high precision alignment mechanism or high NA collimator lens group not only results in increase of production cost but also makes it difficult to construct a compact optical information processing apparatus optical system. In this case, a stabilized operation is not easy to ensure.

On the other hand, if a collimator lens group whose NA is not so high, but focal distance is long is used, the number of lenses is decreased and the alignment mechanism can be simplified, so that a low production cost can be achieved.

However, because the focal distance is long, the distance in the axial direction from the spatial filter up to a position in which the collimator light is obtained is naturally elongated.

Although an attention has to be paid to an entire balance including cost, alignment and performance when practical realization of the optical information processing apparatus optical system is considered, there are few cases in which the above matters have been considered sufficiently in the conventional optical information processing apparatus optical system employing a reflection type spatial light modulator for input image display.

As for the optical information processing apparatus for displaying the input image on the transmission type spatial light modulator, some inventions have been achieved in which the entire optical system is made compact by setting the distance between the front focal plane FF and rear focal plane FB of the Fourier transformation lens group to less than twice (2f) the focal distance, as disclosed in Jpn. Pat. Appln. KOKAI Publication No. 5-88079.

In the design example of Jpn. Pat. Appln. KOKAI Publication No. 5-88079, as shown in FIG. 19, the optical information processing apparatus optical system using the transmission type spatial light modulator has been designed considering its compactness.

However, this structure cannot be applied to the optical information processing apparatus optical system in which the polarized beam splitter 19 is disposed between the Fourier transformation lens group 15 and reflection type spatial light modulator 14R as shown in FIGS. 17, 18, because a distance between the front focal plane and first plane is short.

In design examples of the conventional Fourier transformation lens group, it is premised that the Fourier transformation lens group is used in an optical information processing apparatus optical system as shown in FIG. 16 which uses the transmission type spatial light modulator for input image display. There has been no concrete design example about the Fourier transformation lens group to be used in the optical information processing apparatus optical system using the reflection type spatial light modulator.

In the optical information processing apparatus optical system using the conventional reflection type spatial light modulator as shown in FIGS. 17, 18, there is no example in which its structure, performance, cost and alignment are considered sufficiently for both the collimator lens group 13 and Fourier transformation lens group 15.

Further, in the conventional example, the collimator lens group 13 and Fourier transformation lens group 15, which are independent optical system, are connected only through the polarized beam splitter 19. That is, the entire optical system has not been considered sufficiently.

(Subject 1)

A first subject of the conventional art is that no compact optical system capable of carrying out various optical information processing such as correlation, convolution, and filtering necessary for the optical information processing apparatus has been achieved.

FIG. 20 shows an example of the most general optical information processing apparatus optical system in which the reflection type SLM 16 is used for filter display.

Light emitted from the coherent light source 10 is changed to collimator light whose wave surface is smoothed by the condensing lens 11, spatial filter 12 and collimator lens group 13 and then projected to the transmission type SLM 14T.

The length between a transmission type SLM 14T in which an input image 141 is displayed and a reflection type SLM 16 in which a filter is displayed is arranged in 2-f (2-focal distance) of a Fourier transformation lens group 15. The length between a reflection type SLM 16 and an image pickup device 18 is arranged in 2-f (2-focal distance) of a Fourier inverse transformation lens group 17.

The transmission type SLM 14T expresses pixel value of the input image 141 by an orientation of liquid crystal molecules in the pixel.

Because information of the input image 141 is modulated to P-polarized light and transmitted without being reflected by the reflection surface 192R of the polarized beam splitter (hereinafter referred to as PBS) 192, the Fourier transformation image 161 is generated on the reflection type SLM 16.

The filter 162 is displayed on the reflection type SLM 16 so that various filterings for optical information processing are carried out.

Because this reflection type SLM 16 modulates information to be read out to S-polarized light, it is reflected by the reflection surface 192R of the PBS 192 and finally a processing result image 181 is obtained on the image pickup device 18 placed near the rear focal plane IFB of the reversed Fourier transformation lens group 17.

FIG. 20 shows an opening as the input image 141, indicating a processing for carrying out bypass filtering to the Fourier transformation image 161 by means of the filter 162, as an example.

FIG. 21 shows a conventional example in which the reflection type SLM 14R is used for displaying the input image 141.

Although this optical information processing apparatus operates in the same way as that shown in FIG. 20, it is different from that of FIG. 20 in that a polarized beam splitter 191 is added to irradiate collimator light.

The collimator light emitted from the collimator lens group 13 is reflected by the reflection surface 191R of the PBS 191 and turned to S-polarized light so as to impinge upon the reflection type SLM 14R.

Next, this collimator light impinges upon the reflection type SLM 14R so as to read out the input image 141.

At that time, information of the input image 141 is expressed in P-polarized light.

Then, this optical information processing apparatus operates in the same way as in FIG. 20 after the reflection type SLM 14R, so that finally the processing result image 181 is obtained on the image pickup device 18.

The same function is secured in a disposition shown in FIG. 22 also.

In this case, the collimator light emitted from the collimator lens group 13 is turned to P-polarized light and beam of light for reading out the input image 141 displayed on the reflection type SLM 14R is turned to S-polarized light.

Then, beam of light having information of the input image 141 is reflected by the respective reflection surfaces 191R, 192R of the PBS 191, 192 and impinges upon the reflection SLM 16.

Filtering is carried out by this reflection SLM 16 so that the processing result image 181 is obtained on the image pickup device 18.

(Subject 2)

A second subject of the conventional art is that the number of the lens elements necessary for the optical information processing apparatus increases.

If the reflection type SLM 16 is used for display of the filter 162, the PBS 192 is necessary for introducing the processing result image 181 to the image pickup device 18.

According to the conventional example shown in FIGS. 20 to 22, this PBS 192 is disposed between the final lens group of the Fourier transformation lens group 15 and the reflection type SLM 16.

At the same time, the PBS 192 is disposed between a first lens group of the reversed Fourier transformation lens group 17 and the front focal plane IFF.

However, if the capacity of a handled image is enlarged, a high optical performance is demanded for the Fourier transformation lens group 15 and reversed Fourier transformation lens group 17.

As a result, there occurs such a problem that the number of the Fourier transformation lens group 15 and reversed Fourier transformation lens group 17 increase so that the total number of the lens elements necessary for the optical information processing apparatus increases enormously.

(Subject 3)

A third subject of the conventional art is that the PBS 192 does not indicate an excellent polarization characteristic.

Here, the PBS has a function for splitting beam of light impinging to S-polarized light and P-polarized light.

For example, in cube type PBS used most generally, the P-polarized light passes through while the S-polarized light is reflected by the reflection surface of the PBS.

If an incident angle of beam of light impinging upon the PBS with respect to the reflection surface of the PBS is substantially 45°, ratio Ts/Tp between the intensity $T_p$ of the passing P-polarized light component and the intensity $T_s$ of the passing S-polarized light component decreases extremely.

At the same time, a ratio $R_p/R_s$ between the intensity $R_s$ of the reflected S-polarized light component and the reflected P-polarized light component also decreases, so that a very high optical quenching ratio is obtained.

If converging beam of light or dispersed beam of light impinges upon the PBS, although the P-polarized light and S-polarized light are split at a high optical quenching ratio in components near 45° in term of incident angle, such a high optical quenching ratio cannot be obtained in beam of light having the other incident angles.

According to the conventional example shown in FIGS. 20, 22, the PBS 192 is disposed between the Fourier transformation lens group 15 on which beam of light is converged and the reflection type SLM 16.

Because information of each pixel of the input image 141 is expressed using polarization of beam of light, if the PBS 192 is disposed at a position like the conventional example, there occurs such a problem that an accurate Fourier transformation image 161 and processing result image 181 cannot be obtained.

Particularly, because a higher NA is demanded for the Fourier transformation lens group as the capacity of handled image increases, in the conventional structure, the problem makes more worse.

(Subject 4)

A fourth subject of the conventional art is that the PBS 191 necessary for indicating the input image 141 on the reflection type SLM 14R does not indicate an excellent polarization characteristic.

If the reflection type SLM 14R is used for displaying the input image 141, the PBS 191 is necessary for irradiation of the collimator light.

According to the conventional example shown in FIGS. 21, 22, this PBS 191 is disposed between the first group of the Fourier transformation lens group 15 and the reflection type SLM 14R.

Although in FIGS. 21, 22, beam of light between the reflection type SLM 14R and PBS 19 is drawn substantially parallel to optical axis, actually, collimator light irradiated on the input image 141 is affected by diffraction at the time of reflection.

This diffraction angle is caused by spatial frequency component of the input image 141 and increases in diffracted light having a higher spatial frequency component.

Therefore, although the PBS 191 functions at a high optical quenching ratio to the diffracted light having a low spatial frequency, there occurs such a problem that an accurate Fourier transformation image 161 cannot be obtained because the function drops if the diffracted light having a high spatial frequency component is applied.

(Subject 5)

A fifth subject of the above described conventional art is that if so-called electric address type SLM is used for the reflection type SLM 16, −1 order and +1 order based on the pixel period structure overlap with the processing result image 181, so that an accurate processing result image cannot be obtained.

FIG. 23 shows a case in which the processing result image 181 is not formed accurately due to an influence of the reflection type SLM 16.

To simplify a description, a process of reflection by the reflection type SLM 16 will be described as transmission.

That is, of the diffracted lights generated in the SLM 14 in which the input image 141 is displayed, those caused by the same frequency component become parallel to each other and impinge upon the Fourier transformation lens group 15, so that after transmission, they are focused on a point on the rear focal plane FB of the Fourier transformation lens group 15.

The Fourier transformation lens group 15 has telecentric feature to the FB plane, and the chief ray of lights generated by each spatial frequency impinges perpendicularly on the FB plane.

The processing result image 181o by the 0 order light not affected by the diffraction of the reflection type SLM 16 is obtained as AoBo on the rear focal plane IFB of the reversed Fourier transformation lens group 17.

Further, the processing result images 181p, 181m obtained by +1 order and −1 order diffracted lights by the reflection type SLM 16 are obtained as ApBp, AmBm.

If an influence of diffraction in the reflection type SLM 16 is not considered, as shown in FIG. 23, the processing result images 181p, 181m by the +1 order and −1 order diffracted lights overlap with the processing result image 181o by the 0 order light not affected by the diffraction of the reflection type SLM 16, so that the problem is raised that an accurate processing result image 181 cannot be obtained.

BRIEF SUMMARY OF THE INVENTION

An object of the present invention is to solve the aforementioned first subject and then provide an optical information processing apparatus using a compact optical system capable of carrying out various optical information processing such as correlation, convolution and filtering.

Another object of the present invention is to solve the aforementioned second to fifth subjects and then provide an optical information processing apparatus which uses the reflection type SLM for filter display, the reflection type SLM being capable of carrying out various optical information processings such as correlation, convolution and filtering to a large capacity image at a high precision and reducing the number of necessary components.

To solve the aforementioned first subject, according to a first aspect of the present invention, there is provided an optical information processing apparatus comprising: a coherent light source; a collimate optical system for collimating light from the coherent light source; a reflection type spatial light modulator for returning the collimate light from the collimate optical system toward the collimate optical system; and a Fourier transformation optical system for Fourier-transforming light from the reflection type spatial light modulator and sharing at least part of optical system with the collimate optical system.

To solve the aforementioned first subject, according to a second aspect of the present invention, there is provided an optical information processing apparatus comprising: a coherent light source; a collimate optical system for collimating light from the coherent light source; a reflection type spatial light modulator for returning the collimate light from the collimate optical system toward the collimate optical system; a Fourier transformation optical system for Fourier-transforming light from the reflection type spatial light modulator and sharing at least part of optical system with the collimate optical system; and a polarized beam splitter disposed in an optical interval between a lens including an emission face of the collimate optical system and a lens including an emission face of the Fourier transformation optical system.

To solve the aforementioned second to fifth subjects, according to a third aspect of the present invention, there is provided an optical information processing apparatus comprising: a coherent light source; a collimate optical system for collimating light; a spatial light modulator for displaying an input image; a polarized beam splitter; and a reflection type spatial light modulator for filtering light, the optical information processing apparatus being so constructed that emission light from the coherent light source passes an incident light path comprising the collimator optical system, the spatial light modulator and the polarized beam splitter in this order and reaches the reflection type spatial light modulator, and light reflected by the reflection type spatial light modulator passes a reflection light path which is reverse to the incident light path and reaches the polarized beam splitter, so that the incident light path and the reflection light path are split by the polarized beam splitter, wherein a shared optical system which is at least part of Fourier transformation optical system for incident light and at least part of reversed Fourier transformation optical system for reflection light is disposed in light path between the polarized beam splitter and the reflection type spatial light modulator.

Further, to solve the aforementioned second to fifth subjects, according to a fourth aspect of the present invention, there is provided an optical information processing apparatus comprising: a coherent light source; a polarized beam splitter; and a reflection type spatial light modulator for displaying an input image, the optical information processing apparatus being so constructed that emission light from the coherent light source passes an incident light path comprising the polarized beam splitter and reaches the reflection type spatial light modulator, and light reflected by the reflection type spatial light modulator passes a reflection light path which is reverse to the incident light path and reaches the polarized beam splitter, so that the incident light path and the reflection light path are split by the polarized beam splitter, wherein an afocal optical system for focusing beam of light on the side of the reflection type spatial light modulator is disposed on optical path between the polarized beam splitter and the reflection type spatial light modulator.

Further, to solve the second to fifth subjects, according to a fifth aspect of the present invention, there is provided an optical information processing apparatus comprising: a polarized beam splitter; and a reflection type spatial light modulator, the optical information processing apparatus being so constructed that incident light passes through an incident light path via the polarized beam splitter up to the reflection type spatial light modulator and reaches the reflection type spatial light modulator and a reflection light from the reflection type spatial light modulator passes through a reflection light path which is reverse to the incident light path and reaches the polarized beam splitter, so that the incident light path and reflection light path are split by the polarized beam splitter, wherein 0 order diffracted light component and ±1 order diffracted light components of the reflection light do not overlap each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

DETAILED DESCRIPTION OF THE INVENTION

Figure 1:
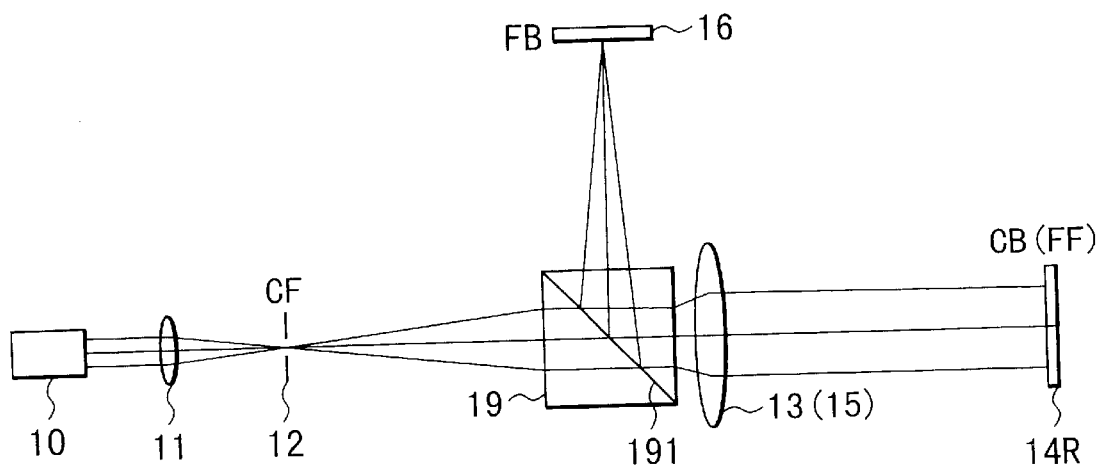
FIG. 1 is a diagram showing a structure of an optical information processing apparatus optical system according to a first embodiment of the present invention.

Reference will now be made in detail to the presently preferred embodiments of the invention as illustrated in the accompanying drawings, in which like reference numerals designates like or corresponding parts.

Hereinafter, the preferred embodiments of the present invention will be described with reference to the accompanying drawings.

(First Embodiment)

To solve the aforementioned first subject and achieve the aforementioned object, an optical information processing apparatus optical system according to a first embodiment of the present invention comprises at least a collimator lens group for converting spherical wave transmitted from a coherent light source to plane wave, polarized beam splitter, reflection type spatial light modulator and Fourier transformation lens group. A single lens group is supplied with functions of the collimator lens group and Fourier transformation lens group and this lens group is disposed between the polarized beam splitter and reflection type spatial light modulator.

An optical information processing apparatus optical system of the first embodiment will be described in detail with reference to FIG. 1.

Beam of light generated by a coherent light source 10 is condensed by a condensing lens 11 and after that, the beam passes through a spatial filter 12 disposed on a front focal plane of a collimator lens group 13.

The spatial filter 12 removes the needless portion of light which may disturb the wavefront of the light from the light beam and corrects the wavefront of the light beam. The beam becomes spherical wave having a smoothed wavefront and is projected into a polarized beam splitter 19.

At this time, the polarization of beam of light is modulated to P-polarized light which passes through the plane 191 of the polarized beam splitter 19.

As a result, beam of light is not reflected by the plane 191 of the polarized beam splitter 19 but transmitted through, so that it impinges upon the collimator lens group 13.

Because as described above, the spatial filter 12 coincides with the front focal plane CF of the collimator lens group 13, when beam of light is emitted from the collimator lens group 13, it is projected into a reflection type spatial light modulator 14R disposed near a rear focal plane CB as collimator light.

When an input image 141 in which beam of light reflected by this reflection type spatial light modulator 14R is displayed is read out, the polarization direction of each pixel is modulated depending on its pixel value.

Reflected light impinges upon the collimator lens group 13 and polarized beam splitter 19 again. Because at this time, the collimator lens group 13 functions as the Fourier transformation lens group 15 shown as a conventional example of FIGS. 21, 22, the rear focal plane CB when this lens group is regarded as the collimator lens group 13 coincides with the front focal plane FF when it is regarded as the Fourier transformation lens group 15.

Of S-polarized beam and P-polarized beam reflected by the reflection type spatial light modulator 14R, the S-polarized component is reflected by a plane 191 of the polarized beam splitter 19 so that a Fourier transformation image 161 of the input image 141 is generated on a filter 16 disposed on a rear focal plane FB of the Fourier transformation lens group 15.

As a result, according to this embodiment, the optical information processing apparatus optical system can be achieved with lens groups fewer by one than the conventional example.

If like the conventional example, this filter 16 is one of various filters for optical information processing and reversed Fourier transformation is carried out with a reversed Fourier transformation lens, a processing signal image is obtained on IFB plane which is a rear focal plane of the reversed Fourier transformation lens group.

(Second Embodiment)

To solve the aforementioned first subject and achieve the aforementioned object, an optical information processing apparatus optical system according to a second embodiment of the present invention comprises at least a collimator lens group for converting spherical wave transmitted from a coherent light source to plane wave, polarized beam splitter, reflection type spatial light modulator and Fourier transformation lens group comprised of two or more lens groups. A first lens group of the Fourier transformation lens group is located between the polarized beam splitter and reflection type spatial light modulator, thereby functioning as a collimator lens group.

Figure 2:
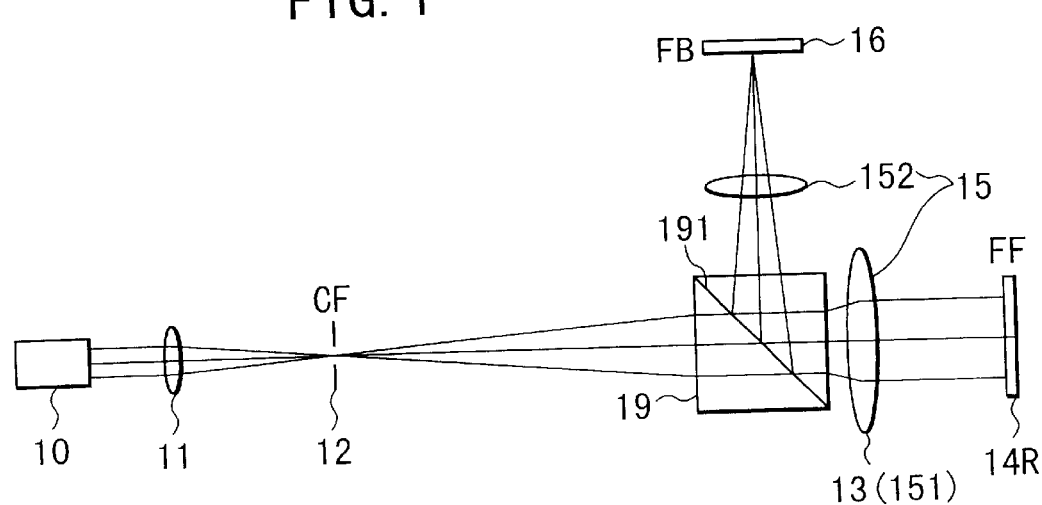
FIG. 2 is a diagram showing a structure of an optical information processing apparatus optical system according to a second embodiment of the present invention.

An optical information processing apparatus optical system according to a second embodiment will be described in detail with reference to FIG. 2.

In the optical information processing apparatus optical system of the second embodiment, like the aforementioned optical information processing apparatus optical system described shown in FIG. 1 described above, the collimator lens group 13 is placed between the polarized beam splitter 19 and the reflection type spatial light modulator 16.

This collimator lens group 13 functions as a first lens element 151 of the Fourier transformation lens group 15 comprised of two or more lens elements.

At this time, the collimator lens group 13 does not require too high NA to facilitate alignment of the spatial filter 12.

A lens group 152 after the second lens group of the Fourier transformation lens group 15 is disposed so as to function against a diffracted beam of S-polarized light reflected by the polarized beam splitter 19.

Although according to the first embodiment, the rear focal plane CB of the collimator lens group 13 coincides with the front focal plane FF of the Fourier transformation lens group 15, according to the second embodiment, the collimator lens group 13 has only to function as the first group of the Fourier transformation lens group 15 and then, the rear focal plane CB of the collimator lens group 13 does not always have to coincide with the front focal plane FF of the Fourier transformation lens group 15.

According to the second embodiment, by constructing the Fourier transformation lens group 15 of two or more lens groups, the optical performance of the Fourier transformation lens group 15 can be improved and at the same time, the front and rear main planes can be adjusted appropriately. Therefore, an optical distance between the Fourier transformation lens group 15 and front focal plane FF can be made shorter than the first embodiment.

Further, the distance between the center of the polarized beam splitter 19 and the front focal plane FF of the Fourier transformation lens group 15 and the distance between the center of the polarized beam splitter 19 and the rear focal plane FB of the Fourier transformation lens group 15 can be made shorter than the first embodiment.

Thus, a redundancy of the distance between the polarized beam splitter 19 and reflection type spatial light modulator 14R can be reduced.

(Third Embodiment)

To solve the aforementioned first subject and achieve the aforementioned object, the optical information processing apparatus optical system of the third embodiment of the present invention has a feature that one or more reflection surface except the polarized beam splitter and reflection type spatial light modulator are provided between the spatial filter and the rear focal plane of the Fourier transformation lens group in the optical information processing apparatus optical system of the first and second embodiments.

The optical information processing apparatus optical system of the third embodiment will be described in detail.

That is, in the optical information processing apparatus optical system of the third embodiment, it is desired that alignment accuracy necessary for the spatial filter 12 is lowered and the NA of the collimator lens group 13 is not raised too high to simplify the alignment mechanism.

On the other hand, to illuminate a relatively large entire input image with a large capacity under a uniform strength, the collimator lens group 13 having a long focal distance is necessary. Therefore, there may be a redundant portion between the spatial filter 12 and the rear focal plane FB of the Fourier transformation lens group 15 in the structures of the first and second embodiments.

Thus, the optical information processing apparatus optical system of the third embodiment has a feature that the structure can be made compact by placing a reflection surface at such a redundant portion so as to provide a return point.

More specifically, the redundancy in the optical axial direction can be avoided by providing such a return point between the spatial filter 12 and polarized beam splitter 19, between the Fourier transformation lens group 15 and reflection type spatial light modulator 14R and between the polarized beam splitter 19 and Fourier transformation plane FB.

As a result, a two-dimensionally compacter optical information processing apparatus optical system than when a high NA collimator lens group is used can be realized in a range between the spatial filter 12 and Fourier transformation plane FF.

Because so high NA is not required for the collimator lens group 13, alignment accuracy necessary for the spatial filter 12 lowers so that the alignment mechanism of that portion can be simplified.

EXAMPLE

Next, lens data of respective examples of the present invention will be described.

The design wave length is 690 nm in all the examples, and the curvature radius and lens thickness (distance between lenses) are standardized depending on a focal distance of the Fourier transformation lens group 15 and they are expressed up to a second place below the decimal point.

A refractive index is expressed up to a third place below the decimal point.

An inversion of sign of lens thickness (distance between lenses) indicates that reflection occurs.

A plane number 0 indicates an opening plane of the spatial filter 12 and a final plane indicates rear focal plane FB of the Fourier transformation lens group 15.

m and n described in the sentence for explaining each example described later are expressed that m=$L_{PBS-FF}/f_F$, n=$L_{PBS-FB}/f_F$, where m indicates a degree of compactness between the center of the polarized beam splitter 19 and front focal plane FF and n indicates a degree of compactness between the center of the polarized beam splitter 19 and the rear focal plane FB.

Here, $L_{PBS-FF}$ indicates a distance between the center of the polarized beam splitter 19 and the front focal plane FF of the Fourier transformation lens group 15 and $L_{PBS-FB}$ indicates a distance between the center of the polarized beam splitter 19 and the rear focal plane FB of the Fourier transformation lens group 15 and $f_F$ indicates a focal distance of the Fourier transformation lens group 15.

A sum of m and n indicates a value that a distance between the front focal plane FF and rear focal plane FB of the Fourier transformation lens group 15 is standardized by a focal distance fF of the Fourier transformation lens group 15.

Example 1

Figure 3:
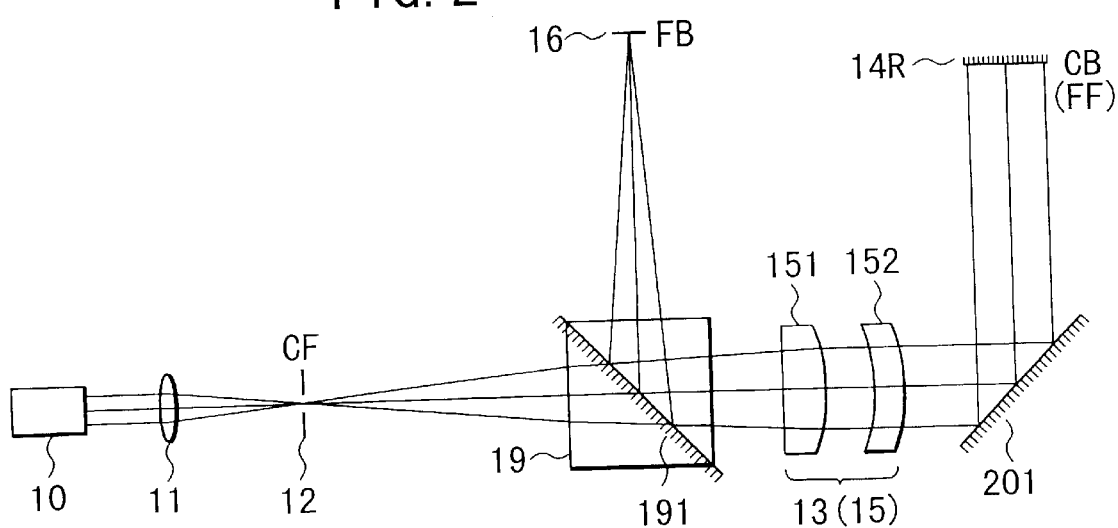
FIG. 3 is a diagram showing a structure of an optical information processing apparatus optical system according to example 1 of the present invention.

FIG. 3 shows an optical system of example 1.

This example 1 is an example for realizing the Embodiments 1 and 3.

As shown in FIG. 3, after beam of light emitted from a coherent light source 10 is condensed by a condensing lens 11, it passes through an opening of a spatial filter 12.

A spot size of the condensing lens 11 and an opening size of the spatial filter 12 are determined so as to remove disturbance components contained before it passes, so that coherent light passes through as effectively as possible and after it passes, wave surface of dispersed spherical wave is arranged smooth.

Then, beam of light after it passes through the spatial filter 12 is dispersed as spherical wave and passes through the polarized beam splitter 19, and finally enters the collimator lens group 13 comprised of meniscus lens group having positive and negative powers.

At this time, the direction of polarization of beam of light is set to obtain P-polarized light with respect to a plane 191 of the polarized beam splitter 19 and the spatial filter 12 is placed so as to coincide with the front focal plane CF of this collimator lens group 13.

As a result, beam of light of dispersed P-polarized light is not reflected by the plane 191 of the polarized beam splitter 19 but passes therethrough so that it is collimated by the collimator lens group 13.

In this case, to achieve two-dimensional compactness, this collimate light impinges at angle of 45° with respect to the mirror 201 and the optical axis is bent by 90°.

After that, the collimator light impinges upon the reflection type spatial light modulator 14R disposed on the rear focal plane CB of the collimator lens group 13 so that the input image 141 is read out.

Read-out of the input image 141 displayed on the reflection type spatial light modulator 14R is carried out by modulating the polarized light direction of the reflected light to S-polarized component depending on values of each pixel of the input image 141.

The modulated reflection light is reflected by a mirror 201 and impinges upon the collimator lens group 13 again.

This collimator lens group 13 functions as the Fourier transformation lens group 15 against light reflected by the reflection type spatial light modulator 14R and a plane in which the reflection type spatial light modulator 14R is placed is the front focal plane of the Fourier transformation lens group 15.

The S-polarized light component of the reflected light is reflected by the plane 191 of the polarized beam splitter 19 so that corresponding to a reflection light of the S-polarized light component of the Fourier transformation lens group 15, a Fourier transformation image 161 of the input image 141 is generated on the rear focal plane FB.

In this example 1, m and n are so that m=1.43 and n=0.72.

Further, the two-dimensional compactness is achieved by disposing the mirror 201 between the polarized beam splitter 19 and reflection type spatial light modulator 14R.

Table 1 below indicates lens data of design example of example 1.

TABLE 1

| Plane number | Curvature radius | Thickness | Refractive index |
|---|---|---|---|
| 0 | ∞ | 0.57 | |
| 1 | ∞ | 0.30 | 0.513 |
| 2 | ∞ | 0.14 | |
| 3 | −16.71 | 0.08 | 1.716 |
| 4 | −0.58 | 0.09 | |
| 5 | −0.36 | 0.07 | 1.513 |
| 6 | −0.43 | 0.20 | |
| 7 | ∞ | −0.69 | reflection surface (45°) |
| 8 | ∞ | 0.69 | reflection surface |
| 9 | ∞ | −0.20 | reflection surface (45°) |
| 10 | −0.43 | −0.07 | 1.513 |
| 11 | −0.36 | −0.09 | |
| 12 | −0.58 | −0.08 | 1.716 |
| 13 | −16.71 | −0.14 | |
| 14 | ∞ | −0.15 | 1.513 |
| 15 | ∞ | 0.15 | reflection surface (45°) |
| 16 | ∞ | 0.00 | |

Example 2

Figure 4:
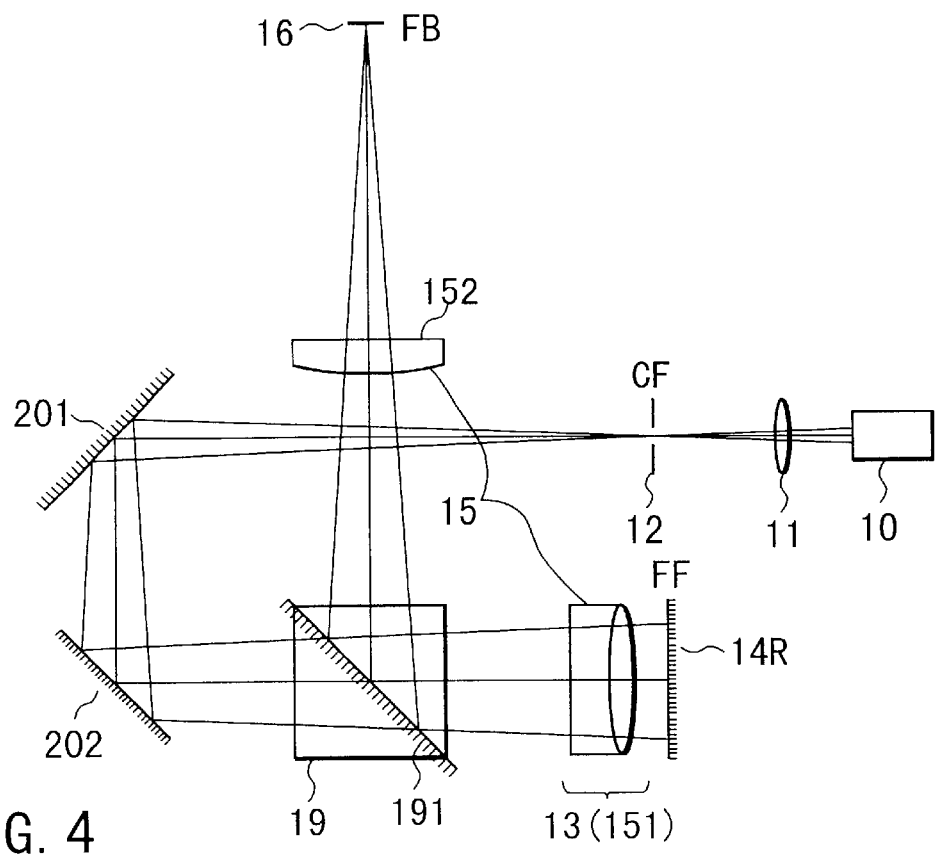
FIG. 4 is a diagram showing a structure of an optical information processing apparatus optical system according to example 2 of the present invention.

FIG. 4 shows an optical information processing apparatus optical system of example 2.

This example 2 is an example for realizing the Embodiments 2 and 3.

As shown in FIG. 4, a coherent light source 10, condensing lens 11, spatial filter 12 and polarized beam splitter 19 are the same as example 1. A behavior of beam of light which passes through the spatial filter 12 and reaches the filter plane FB is completely the same as example 1.

Here, a mirror 201 and a mirror 202 are disposed between the spatial filter 12 and polarized beam splitter 19. Main beam of spherical wave emitted from the spatial filter 12 impinges upon the mirrors 201, 202 at angle of 45° so that the optical axis is bent at 90° by each mirror.

As a result, because this prevents an enlargement of the optical information processing apparatus optical system in a single direction, two-dimensional compactness can be achieved.

The Fourier transformation lens group 15 is comprised of two groups and as shown in FIG. 4, a polarized beam splitter 19 is disposed between the first lens group 151 and second lens group 152.

The first lens group 151 is cemented lens comprised of both-side convex lens having a positive power and a meniscus lens having a negative power and functions as the collimator lens group 13.

Different from example 1 described above, this collimator lens group 13 has only to function as part of the Fourier transformation lens group 15. Thus, the front focal plane FF of the Fourier transformation lens group 15 does not have to coincide with the rear focal plane CB of the collimator lens group 13.

Because the Fourier transformation lens group 15 is comprised of two or more lens groups, the front main plane and rear main plane can be adjusted appropriately. Therefore, a distance between the reflection type spatial light modulator 14R and polarized beam splitter 19 can be made shorter than the above described example 1.

Because according to example 2, the values of m and n are such that m=0.52 and n=1.17, compact optical information processing apparatus optical system can be achieved despite the polarized beam splitter 19.

Table 2 below indicates lens data of example 2.

TABLE 2

| Plane number | Curvature radius | Thickness | Refractive index |
|---|---|---|---|
| 0 | ∞ | 0.96 | |
| 1 | ∞ | −0.44 | reflection surface (45°) |
| 2 | ∞ | 0.33 | reflection surface (45°) |
| 3 | ∞ | 0.28 | 1.513 |
| 4 | ∞ | 0.22 | |
| 5 | 13.58 | 0.07 | 1.640 |
| 6 | 0.85 | 0.05 | 1.513 |
| 7 | −0.92 | 0.06 | |
| 8 | ∞ | −0.06 | reflection surface |
| 9 | −0.92 | −0.05 | 1.513 |
| 10 | 0.85 | −0.07 | 1.640 |
| 11 | 13.58 | −0.22 | |
| 12 | ∞ | −0.14 | 1.513 |
| 13 | ∞ | 0.14 | reflection surface (45°) |
| 14 | ∞ | 0.42 | |
| 15 | 0.61 | 0.06 | 1.741 |
| 16 | 2.39 | 0.56 | |
| 17 | ∞ | 0.00 | |

Example 3

Figure 5:
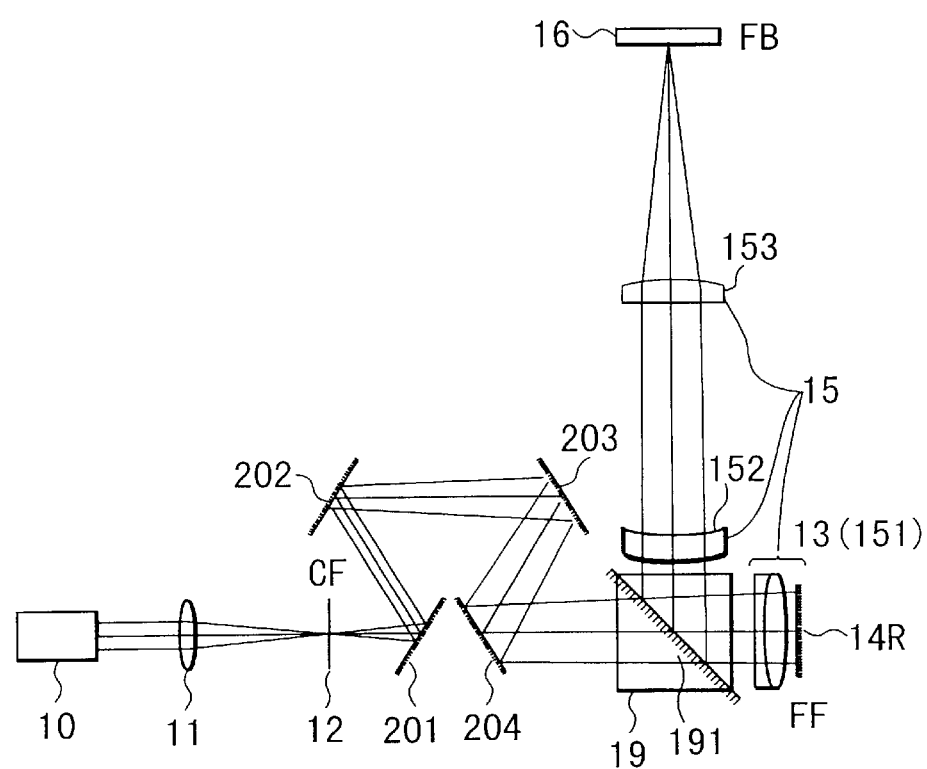
FIG. 5 is a diagram showing a structure of an optical information processing apparatus optical system according to example 3 of the present invention.

FIG. 5 shows an optical information processing apparatus optical system of example 3.

This example 3 is an example for realizing the Embodiments 2 and 3.

As shown in FIG. 5, a coherent light source 10, condensing lens 11, spatial filter 12 and polarized beam splitter 19 are the same as the example 1, and a behavior of beam of light which passes through the spatial filter 12 and reaches the filter surface FF is completely the same as example 1.

Mirrors 201, 202, 203, 204 are disposed between the spatial filter 12 and collimator lens group 13. Spherical wave emitted from the spatial filter 12 impinges upon the respective mirrors 201, 202, 203, 204 at incident angle of 30° and each time it is reflected, the optical axis is bent at 60°.

As a result, a distance in one direction of the optical information processing apparatus optical system is shortened so as to achieve two-dimensional compactness.

The Fourier transformation lens group 15 is comprised of three groups and as shown in FIG. 5, a polarized beam splitter 19 is disposed between the first lens group 151 and second lens group 152.

The first lens group 151 has an action as the collimator lens and is comprised of cemented lens in which lenses having positive and negative powers are bonded.

Meniscus lenses having negative and positive powers are used in the lens element 152 of the second group and lens element 153 of the third group.

Because the collimator lens group 13 functions as part of the Fourier transformation lens group 15, the front focal plane FF of the Fourier transformation lens group 15 does not have to coincide with the rear focal plane CB of the collimator lens group 13.

Because the Fourier transformation lens group is comprised of three lens groups, the front main plane and rear main plane can be adjusted more easily than the two-group structure of the example 2.

As a result, the distance between the reflection type spatial light modulator 14R and polarized beam splitter 19 can be shortened and the value of m is as small as m=0.29.

Further, although according to example 3, the polarized beam splitter 19 is within an optical system, the value of n is also as small as n=1.5, and therefore, a compact optical information processing apparatus optical system can be realized.

Table 3 below shows lens data of example 3.

TABLE 3

| Plane number | Curvature radius | Thickness | Refractive index |
|---|---|---|---|
| 0 | ∞ | 0.20 | |
| 1 | ∞ | −0.35 | reflection surface (30°) |
| 2 | ∞ | 0.50 | reflection surface (30°) |
| 3 | ∞ | −0.35 | reflection surface (30°) |
| 4 | ∞ | 0.30 | reflection surface (30°) |
| 5 | ∞ | 0.25 | 1.513 |
| 6 | −28.33 | 0.06 | |
| 7 | 0.90 | 0.05 | 1.640 |
| 8 | −0.78 | 0.05 | 0.513 |
| 9 | ∞ | 0.01 | |
| 10 | −0.78 | −0.01 | reflection surface |
| 11 | 0.90 | −0.05 | |
| 12 | −28.33 | −0.05 | 1.640 |
| 13 | ∞ | −0.06 | |
| 14 | ∞ | −0.13 | 1.513 |
| 15 | ∞ | 0.13 | reflection surface (45°) |
| 16 | 0.36 | 0.03 | |
| 17 | 0.27 | 0.05 | 1.513 |
| 18 | 6.61 | 0.52 | |
| 19 | −0.68 | 0.05 | 1.741 |
| 20 | ∞ | 0.66 | |
| 21 | ∞ | 0.00 | |

Example 4

Figure 6:
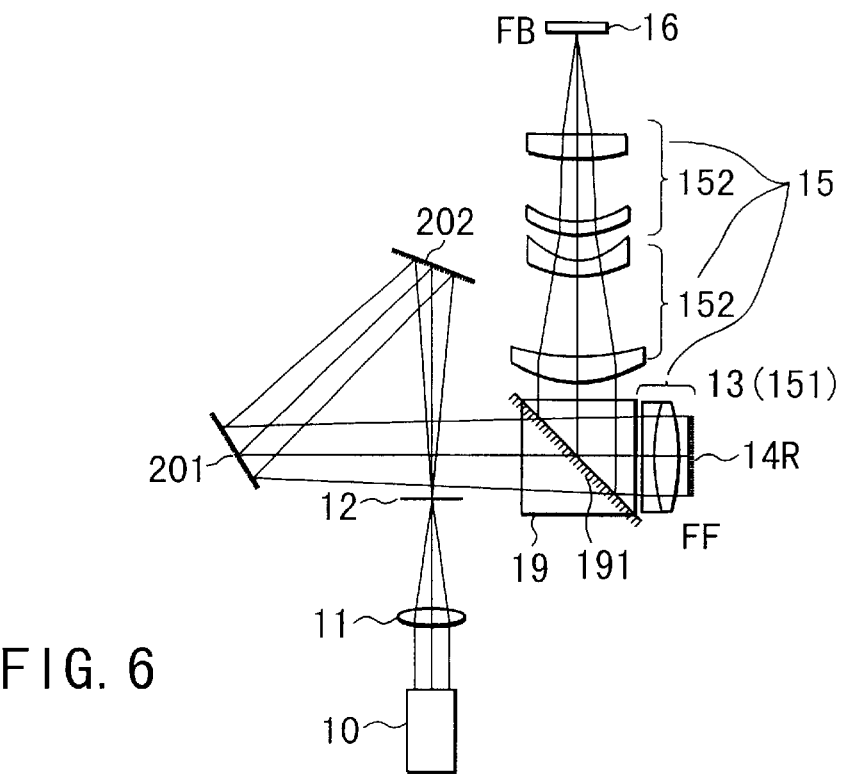
FIG. 6 is a diagram showing a structure of an optical information processing apparatus optical system according to example 4 of the present invention.

FIG. 6 shows an optical information processing apparatus optical system of example 4.

This example 4 is an example for realizing the Embodiments 2 and 3.

That is, as shown in FIG. 6, the structures of a coherent light source 10, condensing lens 11, spatial filter 12, and polarized beam splitter 19 are the same as the above described embodiments.

In this case, a mirror 201 and a mirror 202 are placed between the spatial filter 12 and polarized beam splitter 19. Spherical wave emitted from the spatial filter 12 impinges upon the mirrors 201 and 202 at an incident angle of 22.5°. Thus, the direction of the optical axes are changed at 45°, so that the optical axes form a shape of "4" as viewed from above.

Consequently, a redundant distance between the spatial filter 12 and the polarized beam splitter 19 can be shortened, so that the compactness of the optical information processing apparatus optical system can be achieved.

Here, the Fourier transformation lens group 15 is comprised of three lens groups. The first lens group 151 is comprised of cemented lens, the second lens group 152 is comprised of concave and convex meniscus lenses and the third lens group is comprised of two convex meniscus lenses.

The first lens group 151 of the Fourier transformation lens group 15 functions as the collimator lens group 13.

Then, because the Fourier transformation lens group 15 is comprised of three lens groups, the value of m is as small as m=0.29.

Because the second lens group 152 and the third lens group 153 of the Fourier transformation lens group 15 are comprised of two lens elements, the value of n is also as small as n=1.21.

As a result, according to the example 4, such a compact optical information processing apparatus optical system can be achieved.

Table 4 below shows lens data of example 4.

TABLE 4

| Plane number | Curvature radius | Thickness | Refractive index |
|---|---|---|---|
| 0 | ∞ | 0.67 | |
| 1 | ∞ | −0.75 | reflection surface |
| 2 | ∞ | 0.75 | reflection surface |
| 3 | ∞ | 0.31 | 1.513 |
| 4 | −4.41 | 0.01 | |
| 5 | 0.93 | 0.05 | 1.874 |
| 6 | −0.77 | 0.06 | 1.640 |
| 7 | ∞ | 0.01 | |
| 8 | −0.77 | −0.01 | reflection surface |
| 9 | 0.93 | −0.06 | 1.640 |
| 10 | −4.41 | −0.05 | 1.874 |
| 11 | ∞ | −0.01 | |
| 12 | ∞ | −0.16 | 1.513 |
| 13 | ∞ | 0.16 | reflection surface |
| 14 | 0.29 | 0.04 | |
| 15 | 0.45 | 0.07 | 1.536 |
| 16 | 0.31 | 0.24 | |
| 17 | 0.14 | 0.04 | 1.748 |
| 18 | 0.18 | 0.07 | |
| 19 | 0.20 | 0.05 | 1.645 |
| 20 | 0.22 | 0.18 | |
| 21 | 0.58 | 0.08 | 1.657 |
| 22 | ∞ | 0.29 | |
| 23 | ∞ | ∞ | |

Example 5

Figure 7:
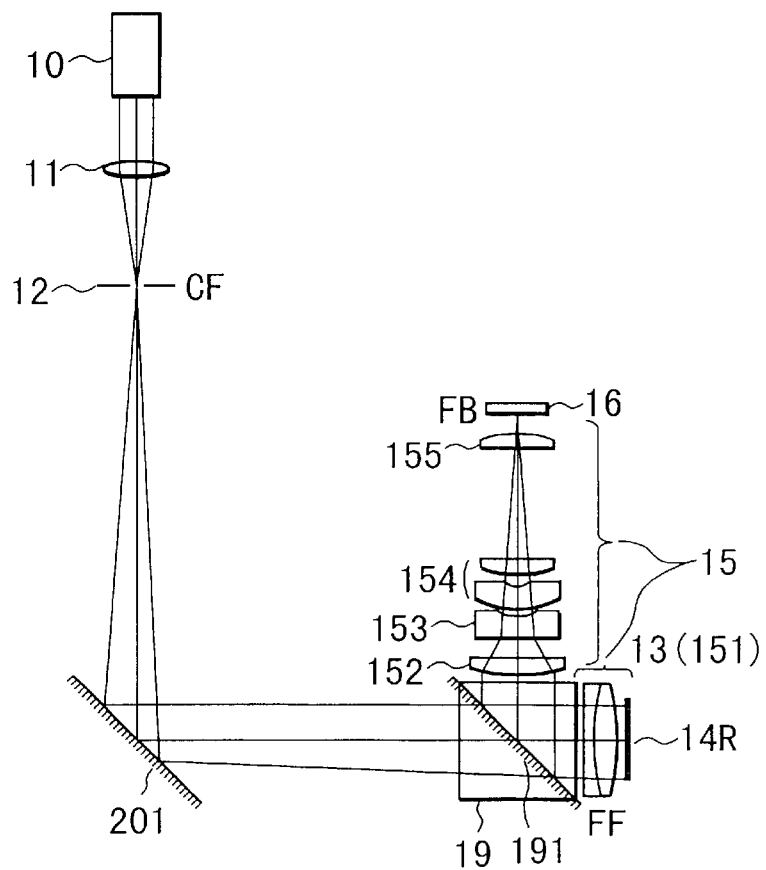
FIG. 7 is a diagram showing a structure of an optical information processing apparatus optical system according to example 5 of the present invention.

FIG. 7 shows a structure of the optical information processing apparatus optical system of example 5.

This example 5 is an example for realizing the Embodiment 2 and 3.

That is, the structure comprised of a coherent light source 10, condensing lens 11, spatial filter 12 and polarized beam splitter 19 is the same as the above described embodiment.

Because in FIG. 7, the mirror 201 is disposed between the spatial filter 12 and polarized beam splitter 19, spherical wave emitted from the spatial filter 12 impinges upon the mirror 201 at the incident angle of 45° so that the optical axis is bent at 90°.

As a result, a redundant portion between the spatial filter 12 and polarized beam splitter 19 is shortened.

The Fourier transformation lens group 15 is comprised of five lens groups. The first lens group 151 is cemented lens comprised of both-side convex lens having positive power and a meniscus lens having negative power. The second lens group 152 is comprised of a convex meniscus lens and the third lens group 153 is comprised of concave lens.

Further, the fourth lens group is comprised of two meniscus lenses and the fifth lens group is comprised of a single meniscus lens.

The first lens group 151 functions as the collimator lens group 13.

Then, by increasing the number of the Fourier transformation lens group 15, a very compact optical information processing apparatus optical system of m=0.22 and n=0.78 can be obtained.

Because the sum of m and n is 1.0, the Fourier transformation lens group 15 having a very short distance between front and rear focal planes can be achieved.

Table 5 below shows lens data of example 5.

TABLE 5

| Plane number | Curvature radius | Thickness | Refractive index |
|---|---|---|---|
| 0 | ∞ | 1.00 | |
| 1 | ∞ | −0.76 | reflection surface (45°) |
| 2 | ∞ | −0.25 | 1.513 |
| 3 | ∞ | −0.01 | |
| 4 | 45.79 | −0.03 | 1.754 |
| 5 | −0.65 | −0.05 | 1.640 |
| 6 | 0.74 | −0.01 | |
| 7 | ∞ | 0.01 | reflection surface |
| 8 | 0.74 | 0.05 | 1.640 |
| 9 | −0.65 | 0.03 | 1.754 |
| 10 | 45.79 | 0.01 | |
| 11 | ∞ | 0.13 | 1.513 |
| 12 | ∞ | −0.13 | reflection surface (45°) |
| 13 | ∞ | −0.01 | |
| 14 | −0.21 | −0.06 | 1.754 |
| 15 | −3.23 | −0.05 | |
| 16 | 0.91 | −0.06 | 1.489 |
| 17 | −0.11 | −0.02 | |
| 18 | −0.18 | −0.05 | 1.755 |
| 19 | −0.10 | −0.01 | |
| 20 | −0.11 | −0.03 | 1.487 |
| 21 | −0.17 | −0.27 | |
| 22 | 0.51 | −0.03 | 1.487 |
| 23 | 0.16 | −0.55 | |
| 24 | ∞ | 0.00 | |

Although as described in the above described embodiments and examples, the collimator optical system and Fourier transformation optical system are so structured that they share at least part of them as a feature of the present invention, it is the best that they share all.

Further, it is permissible that the collimator optical system is comprised of front group and rear group and the Fourier transformation optical system is also comprised of front group and rear group, while a polarized beam splitter is disposed between the front group and rear group of the collimator optical system so that the rear group of the collimator optical system is shared by the front group of the Fourier transformation optical system.

The polarized beam splitter as an optical path separating means is required to be located at a predetermined position on the side of the light source with respect to the emission surface of the collimator.

As described above, according to the first to third embodiments, the aforementioned first subject of the prior art is solved and consequently, the optical information processing apparatus containing the compact optical information processing apparatus optical system capable of achieving various processings such as correlation, convolution, filtering and the like can be provided.

(Fourth Embodiment)

The optical information processing apparatus of the fourth embodiment of the present invention is intended to solve the second subject that the number of the lens groups necessary for the optical information processing apparatus is increased if the number of the Fourier transformation lens groups and the number of the reversed Fourier transformation lens groups are increased, and to solve the third subject that the PBS to be used for obtaining a result of processing such as filtering does not function due to a high optical quenching ratio. Thus, the optical information processing apparatus of this embodiment is comprised of Fourier transformation lens group having at least two lens groups, a PBS, reflection type spatial light modulator and reversed Fourier transformation lens group. The PBS is disposed on the incident side with respect to a final lens group of the Fourier transformation lens group, so that the final lens group functions as entire or part lens group of the reversed Fourier transformation lens.

The structure and operation of the optical information processing apparatus of the fourth embodiment of the present invention will be described with reference to FIG. 8.

The optical information processing apparatus of the fourth embodiment is comprised of a coherent light source 10, condensing lens 11, spatial filter 12, collimator lens group 13, transmission type SLM 14T, Fourier transformation lens 15, PBS 192, reflection type SLM 16, reversed Fourier transformation lens group 17 and image pickup device 18.

The Fourier transformation lens group 15 is comprised of the lens group 151 and lens group 152 and a PBS 192 is disposed therebetween.

The lens group 152 functions as a lens group 171 of the reversed Fourier transformation lens group 17 comprised of the lens groups 171 and 172.

Beam of light emitted from the coherent light source 10 is condensed by the condensing lens 11 to the spatial filter 12 so as to remove disturbance components in the wave surface.

Because the spatial filter 12 is disposed near the front focal plane CF of the collimator lens group 13, beam of light focused on the spatial filter 12 passes through the collimator lens group 13 and after that, impinges upon the transmission type SLM 14T as collimated light.

The input image 141 (see FIG. 20) is displayed on this transmission type SLM 14T and then, the Fourier transformation image 161 (see FIG. 20) is formed on the reflection type SLM 16 disposed near the FB by the Fourier transformation lens group 15.

At this time, the transmission type SLM 14T modulates incident light beam to P-polarized beam so that information of the input image 141 is not reflected by the reflection surface 192R of the PBS 192.

Because light for forming the Fourier transformation image 161 on the reflection type SLM 16 is modulated to S-polarized light by the filter 162 (see FIG. 20) at the time of reflection, it is reflected by the reflection surface 192R of the PBS 192 and then, a processing result image 181 (see FIG. 20) is obtained on the rear focal plane IFB of the reversed Fourier transformation lens group 17.

Here, the lens group 152 (171) functions as a final lens group of the Fourier transformation lens group 15 against beam of light emitted from the PBS 192 and as the first lens group 171 of the reversed Fourier transformation lens group 17 against beam of light emitted from the reflection type SLM 16.

Because the Fourier transformation lens group 15 and reversed Fourier transformation lens group 17 are comprised of two or more lens groups, respectively, the optical performance can be improved.

Because the PBS 192 is disposed on the input side with respect to the final lens group of the Fourier transformation lens group 15, its angle of beam of light relative to the optical axis is smaller than a case where it is disposed between the final lens group of the Fourier transformation lens group 15 and reflection type SLM 16 like conventional example, so that the polarization characteristic of the PBS 192 is improved.

Further, because the final lens group of the Fourier transformation lens group 15 functions as part of the reversed Fourier transformation lens group 17, the number of optical elements necessary for the optical information processing apparatus can be reduced.

Figure 8:
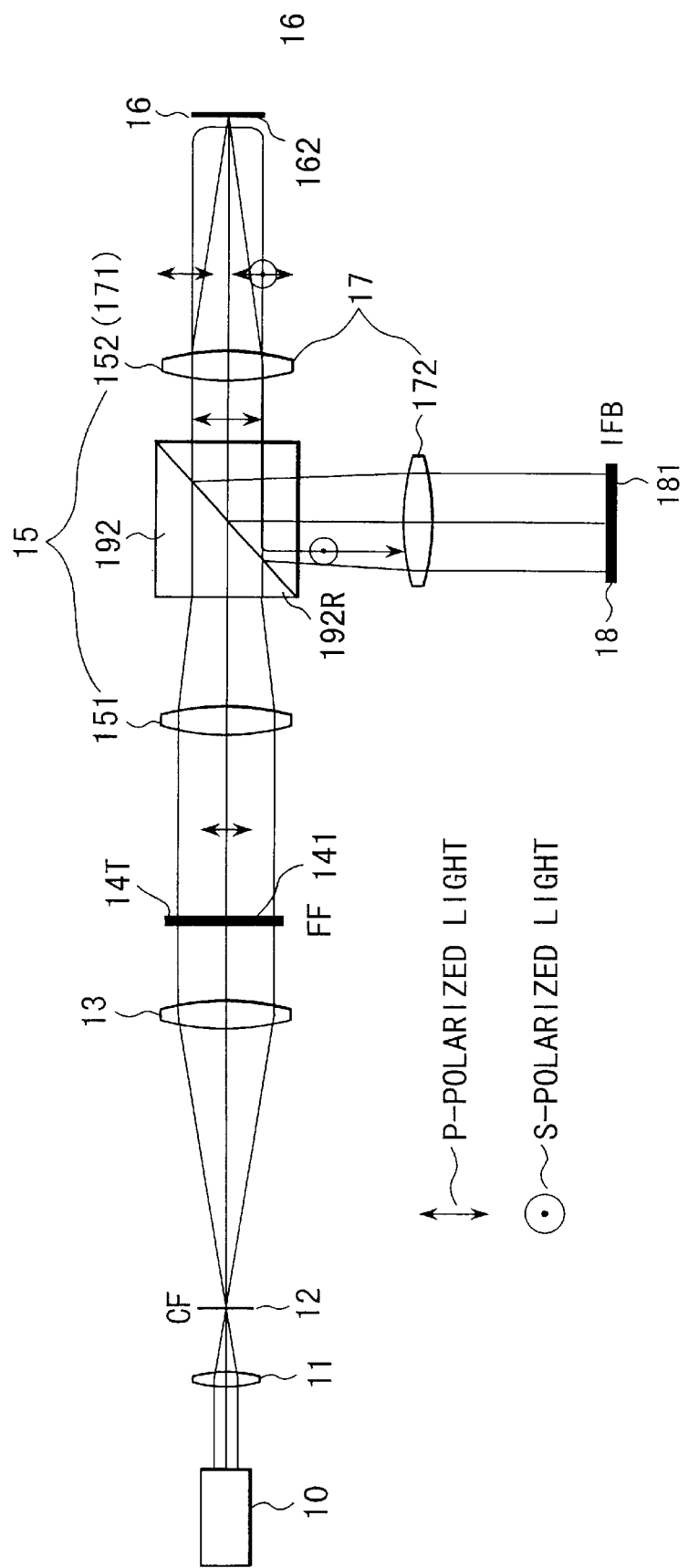
FIG. 8 is a diagram for explaining a structure of an optical information processing apparatus according to a fourth embodiment of the present invention.

Although light polarizer and analyzer are required if the transmission type SLM 14T shown in FIG. 8 is used to display the input image 141, as evident to those skilled in the art, representation thereof in FIG. 8 is omitted.

(Fifth Embodiment)

The optical information processing apparatus of the fifth embodiment of the present invention is intended to solve the aforementioned fourth subject that when the reflection type SLM is used for input image display, the PBS for collimator light irradiation does not function at a high optical quenching ratio against a diffracted light spread by the input image. Therefore, the optical information processing apparatus is comprised of a coherent light source 10, condensing lens 11, spatial filter 12, collimator optical system, first reflection type SLM for displaying the input image, Fourier transformation lens group for Fourier-transforming light from the first reflection type SLM and comprised of three or more lens groups in which the first group has a negative power and the second group has a positive power, second reflection type SLM for filtering Fourier transformation image obtained by the Fourier transformation lens group, reversed Fourier transformation lens group, and first and second PBSs. The aforementioned collimator optical system shares the aforementioned Fourier transformation lens group and part of the optical system. The final lens group of the Fourier transformation lens group has a function as an entire or partial lens group of the reversed Fourier transformation lens group.

A structure of operation of the optical information processing apparatus of the fifth embodiment of the present invention will be described with reference to FIG. 9.

The optical information processing apparatus of the fifth embodiment is comprised of a coherent light source 10, condensing lens 11, spatial filter 12, collimator lens group 13, PBS 191, reflection type SLM 14R, Fourier transformation lens 15, PBS 192, reflection type SLM 16, reversed Fourier transformation lens group 17 and image pickup device 18.

Beam of light emitted from the coherent light source 10 is focused on the spatial filter 12 by the condensing lens 11 so as to remove disturbance components in the wave surface.

Because this spatial filter 12 is disposed near the front focal plane of the collimator lens group 13, beam of light focused on the spatial filter 12 passes through the collimator lens group 13 and then impinges upon the PBS 191 as collimator light.

At this time, the collimator light is set to S-polarized light so that it is reflected by the reflection surface 191R of the PBS 191 and projected to the lens groups 132, 133.

These lens groups 132, 133 form afocal optical system, so that beam of the collimator light before impinging upon the PBS 191 is reduced in size and projected to the reflection type SLM in which the input image 141 is displayed.

Because this reflection type SLM 14R modulates information of a read input image (see FIG. 20) to P-polarized light, beam of light having information of the input image 141 is transmitted without being reflected by the PBSs 191 and 192, so that the Fourier transformation image 161 is formed on the reflection type SLM 16.

Because light for forming the Fourier transformation image 161 (see FIG. 20) on this reflection type SLM 16 is modulated to S-polarized light by the filter 162 at the time of reflection, it is reflected by the reflection surface 192R of the PBS 192 and a processing result image 181 (see FIG. 20) is obtained on the image pickup device 18 disposed near the rear focal plane FB of the reversed Fourier transformation lens group 17.

The lens groups 133 (151) and 132 (152) to be used in the collimator lens group 13 and Fourier transformation lens group 15 in common function as afocal optical system which enlarges the width of beam of light with negative and positive powers.

Figure 10:
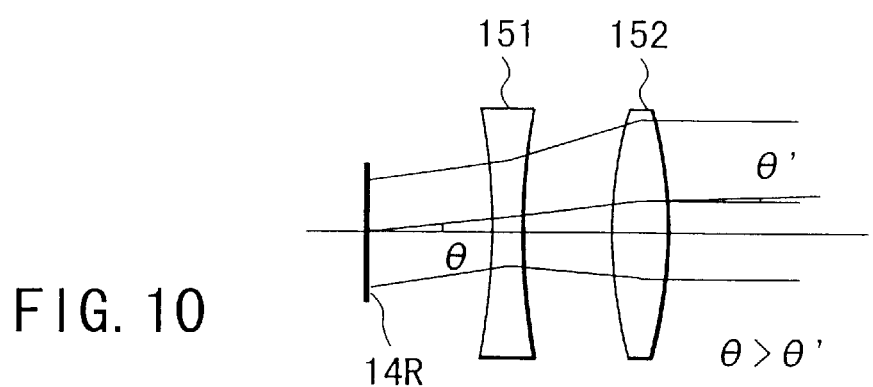
FIG. 10 is a diagram for explaining an afocal optical system of the fifth embodiment of the present invention.

FIG. 10 indicates a state in which beam of light generated by the same spatial frequency diffracted by the reflection type SLM 14R impinges upon the lens groups 151, 152.

An angle of parallel lights emitted from the afocal optical system comprised of two groups having negative and positive powers with respect to the optical axis is smaller than an angle when it impinges.

Figure 21:
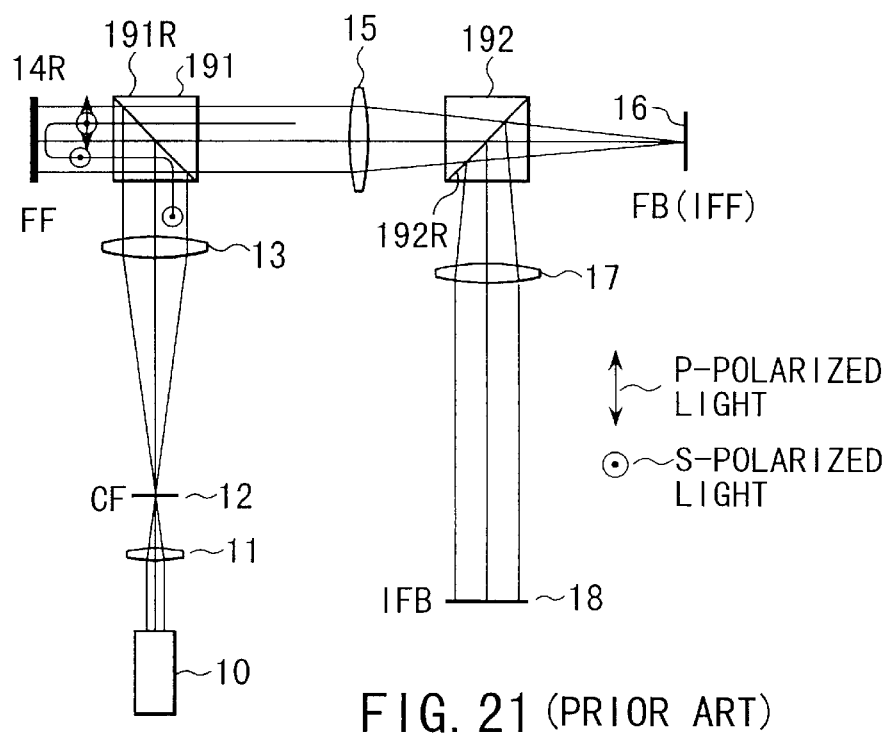
FIG. 21 is a diagram showing a structure of optical information processing apparatus optical system based on the conventional art in which the reflection type SLM is used for both input image display and filter display.
Figure 22:
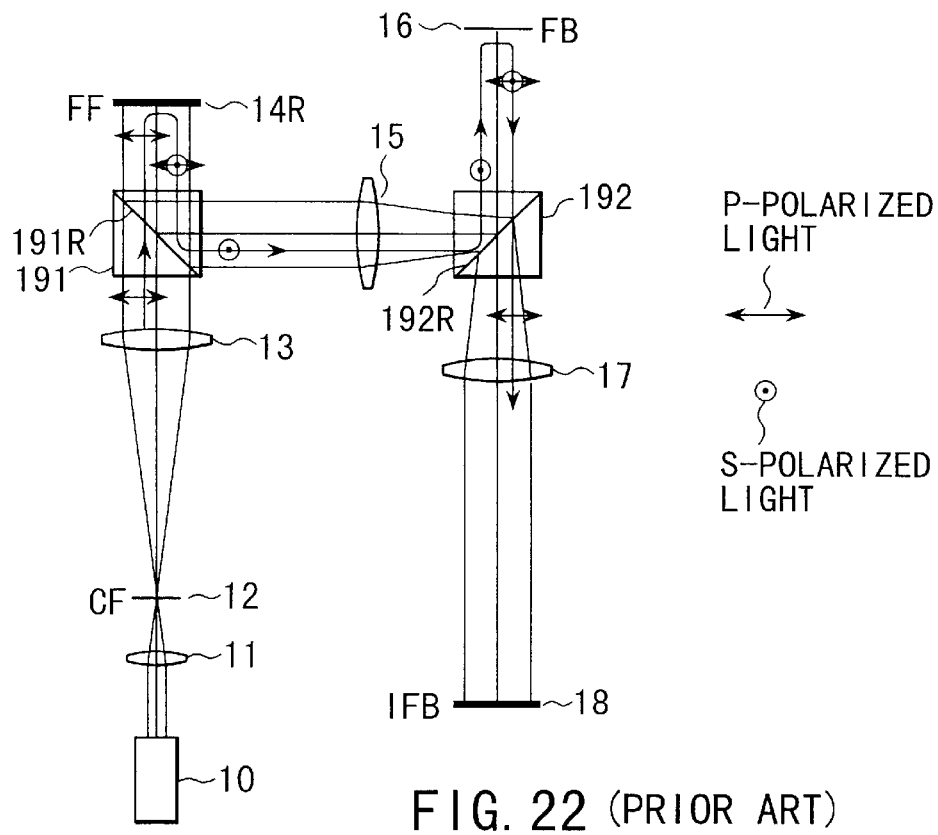
FIG. 22 is a diagram showing a structure of optical information processing apparatus optical system based on the conventional art in which the reflection type SLM is used for both input image display and filter display.

That is, the diffraction angle of a diffracted light generated by the input image 141 decreases when the light is emitted from the lens groups 152, 153 of an expanding afocal optical system and then that light impinges upon the PBS 191. Thus, a higher optical quenching ratio can be achieved than a case in which the PBS 191 is disposed between the reflection type SLM 14R and a first lens group of the Fourier transformation lens group 15 like the conventional example as shown in FIGS. 21, 22.

Because the PBS 192 is disposed just after the PBS 191, an incident angle of impinging beam of light is small and therefore, it functions at a high optical quenching ratio.

Figure 9:
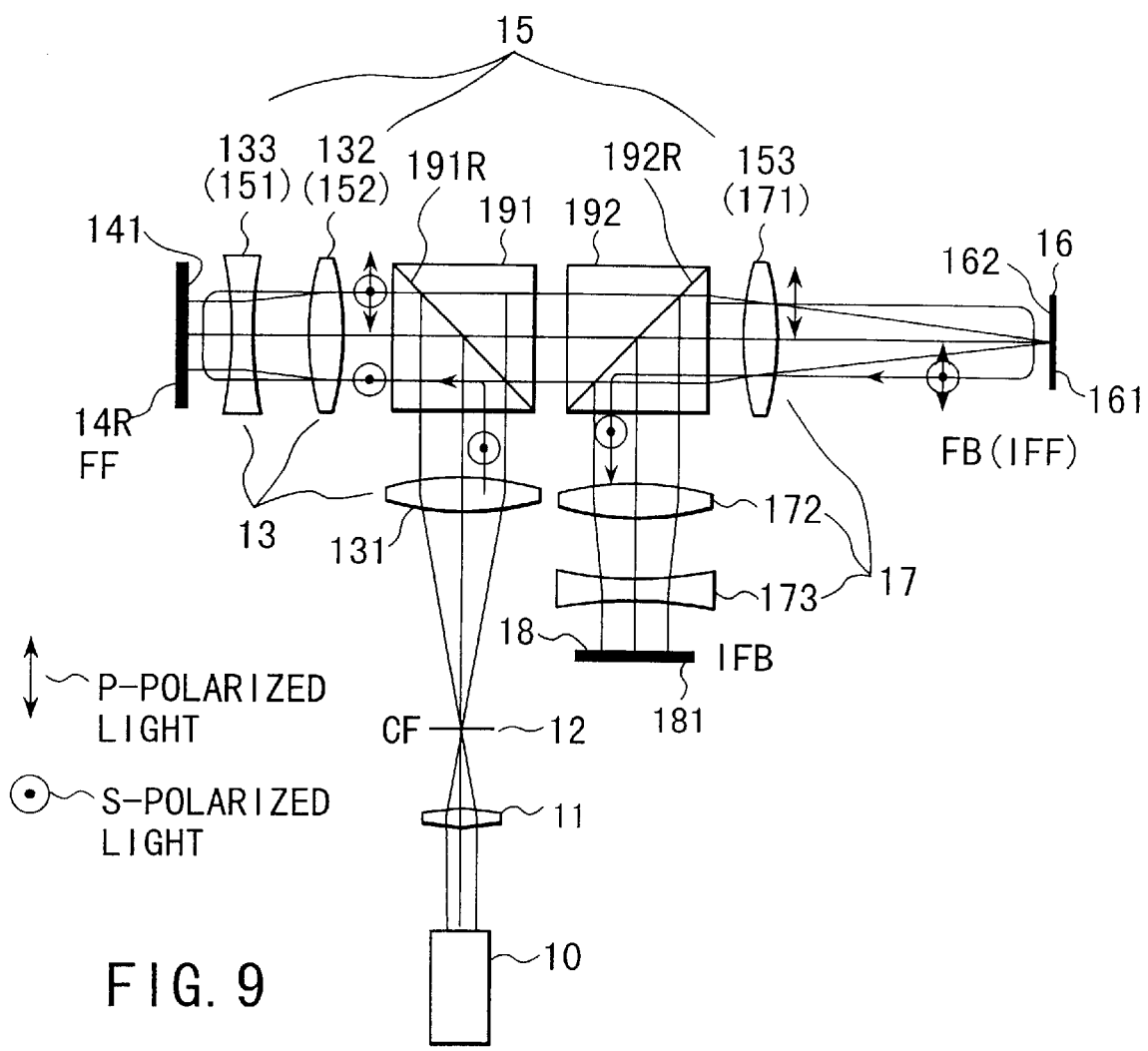
FIG. 9 is a diagram for explaining a structure of an optical information processing apparatus according to a fifth embodiment of the present invention.

In a structure shown in FIG. 9, the lens groups 132, 133 of the collimator lens group 13 function as the second lens group 152 and the first lens group 151 of the Fourier transformation lens group 15, respectively. Further, the lens group 153 of the Fourier transformation lens group 15 functions as the lens group 171 of the reversed Fourier transformation lens group 17.

As a result, as compared to a case where the collimator lens group 13, Fourier transformation lens group 15 and reversed Fourier transformation lens group 17 are prepared independently, the number of necessary lens elements can be reduced.

(Sixth Embodiment)

As described about the aforementioned fourth subject, the optical information processing apparatus of the sixth embodiment satisfies the following equations (1), (2) to prevent an influence of refractive light generated by the reflection type SLM for filter display.

$$\phi min(+) > \theta max \quad (1)$$

$$\phi max(-) > \theta min \quad (2)$$

$\phi max$, $\phi min$ indicate maximum angle and minimum angle when beam of light of the same frequency components of diffracted light generated from the SLM, in which the input image 141 is displayed, is focused after it passes through the Fourier transformation lens group.

$\phi min(+)$, $\phi max(-)$ indicate an angle of +1 order diffracted light at $\theta min$ and −1 order diffracted light at $\theta max$ with respect to the optical axis.

Figure 23:
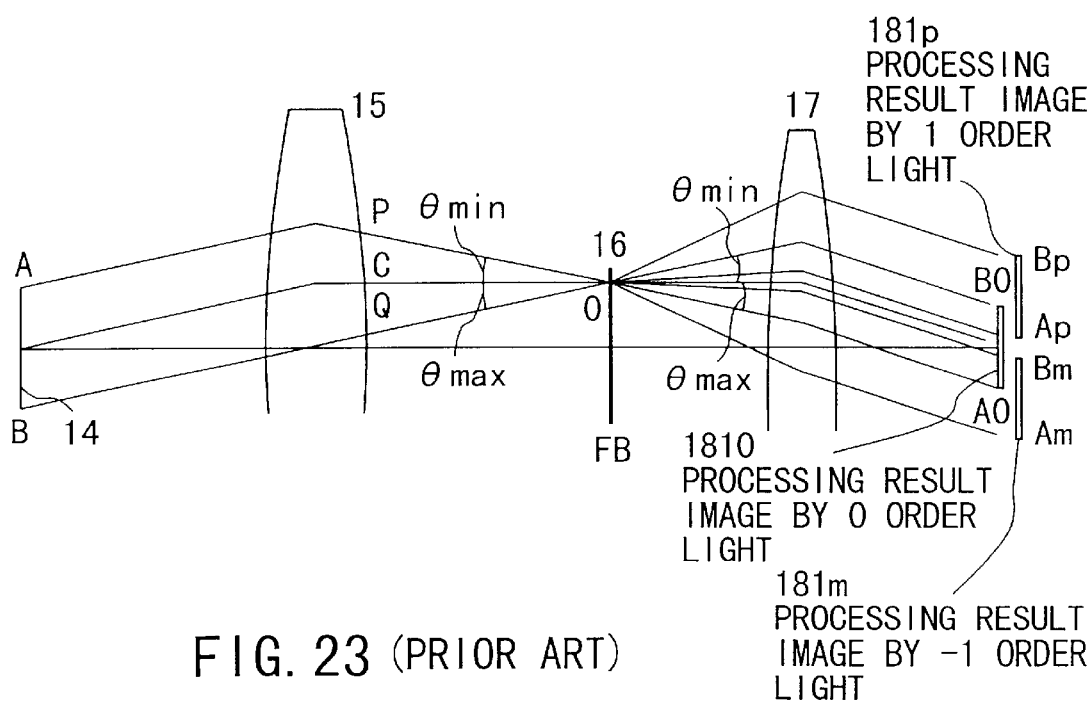
FIG. 23 is a diagram for explaining problems of optical information processing apparatus optical system based on the conventional art in which the reflection type SLM is used for filter display.

FIG. 23 shows a case where processing result images 1810, 181p, 181m generated by −1 order, 0 order, +1 order diffracted lights generated by the reflection type SLM 16 overlap.

Figure 11:
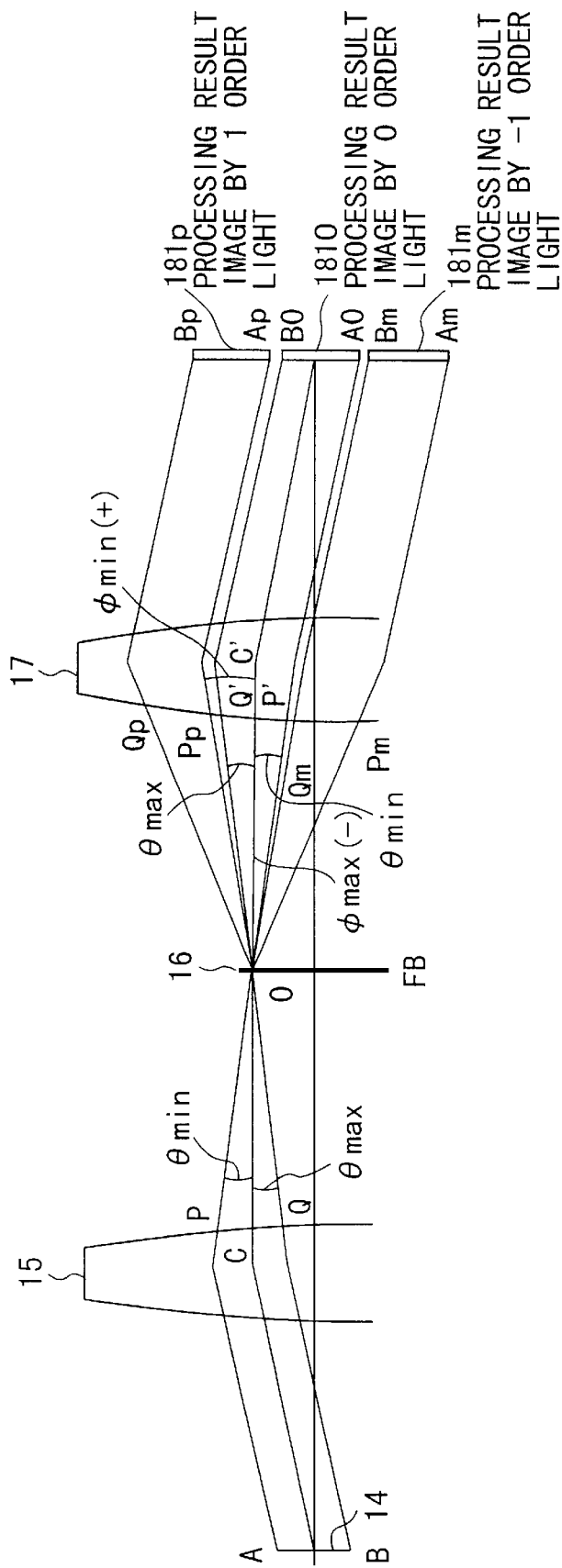
FIG. 11 is a diagram for explaining a structure of an optical information processing apparatus according to a sixth embodiment of the present invention.

FIG. 11 shows a case where processing result images 1810, 181p, 181m generated by −1 order, 0 order, +1 order diffracted light do not overlap each other In FIG. 11, beam of light focused by the Fourier transformation lens group 15 is expressed by POQ.

This indicates a diffracted light generated by the same spatial frequency of the input image 141.

When the diffracted light POQ is further diffracted by the reflection type SLM 16, the +1 order, 0 order, −1 order diffracted lights are expressed by PpOQp, P'OP', PmOQm, respectively, in FIG. 4.

Further, in FIG. 11, it is assumed that main beam of POQ and P'OQ' is CC', angle QOC=$\theta max$>0 and angle POC=$\theta min$<0.

Positive and negative of angle are so assumed that when light is directed to light axis and rotated, clockwise direction is positive and counterclockwise direction is negative.

If this rule is maintained, angle Q'OC' is $\theta max$ and angle P'OC'=$\theta min$.

For processing result images 1810, 181p, 181m by respective diffracted lights not to overlap each other on the rear focal plane FB of the reversed Fourier transformation lens group 17 in FIG. 11, angle $\phi min(+)$=angle PpOC' of +1 order diffracted light at the incident angle $\theta min$ and angle $\phi max$ (−)=angle QmOC' of −1 order diffracted light at the incident angle $\theta max$=angle QmOC' have to satisfy the equations (1), (2) respectively.

Here, $\theta max$ (=−$\theta min$) can be obtained as $\theta max$=−$\theta min$=$\tan^{-1}(r/f_{FL})$ from size 2r of the input image 141 and focal distance $f_{FL}$ of the Fourier transformation lens group 15.

$\phi min(+)$ and $\phi max(-)$ can be obtained from the following equations, $$\sin \theta min(+) = \sin \theta min + (\lambda/d_2)$$

$$\sin \phi max(-) = \sin \theta max - (\lambda/d_2)$$

where $\lambda$ is wave length for use and $d_2$ is a pitch interval of pixel of the reflection type SLM 16.

Therefore, by determining the focal distance $f_{FL}$ of the Fourier transformation lens group 15 so that the equations (1), (2) are satisfied, almost all influence of the diffracted light except 0 order light generated by the reflection type SLM 16 for filter display can be removed. As a result, an accurate processing result image 181 can be obtained.

Example 5

Examples are shown below.

Data about curvature radius, plane interval and refractive index of optical system of respective examples are expressed up to a third place below the decimal point in Tables 6 to 8.

Only data of the Fourier transformation lens group 15 and reversed Fourier transformation lens group 17 are included.

FF, IFB of Tables 6 to 8 indicate the front focal plane of the Fourier transformation lens group 15 and rear focal plane of the reversed Fourier transformation lens group 17.

The curvature radius and plane interval are values standardized by the focal distance $f_{FL}$ of the Fourier transformation lens group 15 and a change of the sign of plane interval indicates reflection.

Example 6

This example 6 is an example for realizing the aforementioned fourth embodiment.

Figure 12:
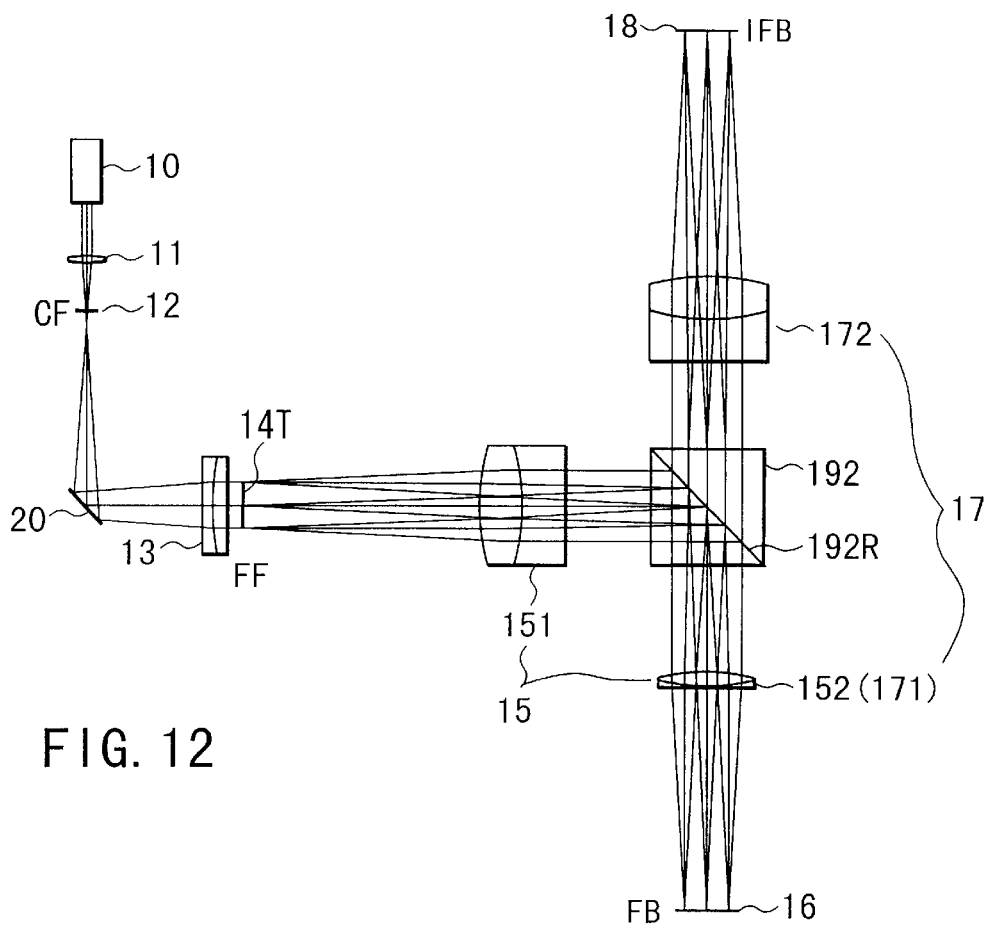
FIG. 12 is a diagram for explaining example 6 of the present invention.

FIG. 12 shows an optical information processing apparatus according to the example 6.

Beam of light emitted from a coherent light source 10 is focused on a spatial filter 12 disposed on the front focal plane CF of a collimator lens group 13 by a condensing lens 11 so as to remove disturbance components from the wave surface.

Beam of light passing through the spatial filter 12 impinges upon the collimator lens group 13 to turn to collimator light.

In FIG. 12, optical axis is bent by 90° by a mirror 20 so as to prevent an elongation of the entire optical system in one direction.

Figure 20:
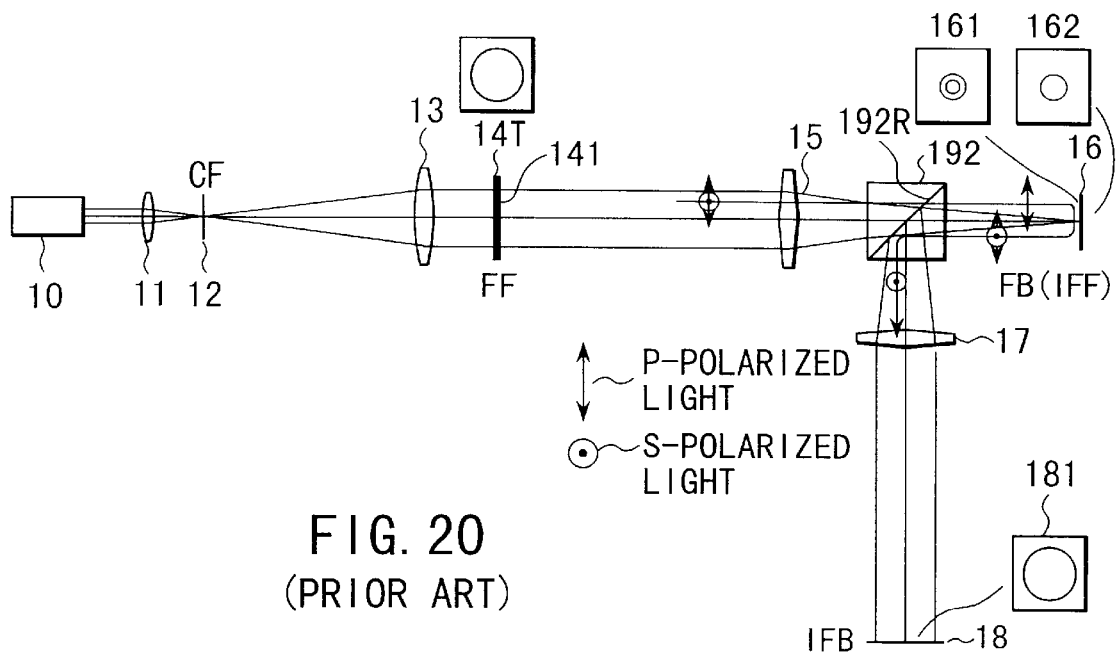
FIG. 20 is a diagram showing a structure of most general optical information processing apparatus optical system based on the conventional art in which transmission type SLM and reflection type SLM are used for input image display and filter display.

The aforementioned collimator light impinges upon the transmission type SLM 14 so as to read information of the input image 141 (see FIG. 20).

At this time, the transmission type SLM14T modulates beam of light having information of the input image 141 to S-polarized light.

Beam of light having information of this input image 141 is reflected by a reflection surface 192R of the PBS 192 and after that, a Fourier transformation image 161 (see FIG. 20) of the input image 141 is formed on the reflection type SLM 16 disposed near the rear focal plane FB of the Fourier transformation lens group 15.

Filtering is carried out by a filter 162 displayed on the reflection type SLM 16 at the time of reflection and a processing result image 181 (see FIG. 20) is obtained on an image pickup device 18 by the reversed Fourier transformation lens group 17.

At this time, beam of light of the processing result image 181 is modulated to P-polarized light at the time of reflection by the reflection type SLM 16 not to be reflected by the reflection surface 192R of the PBS 192.

Here, all of the Fourier transformation lens group 15 have positive power and, is so constructed that the PBS 192 is disposed between cemented lens groups 151 and 152.

That is, although beam of light generated by the same spatial frequency dispatched from the transmission type SLM 14T is transmitted as parallel beam of light just before it impinges upon the lens group 151, it is focused through two stages by the lens groups 151, 152.

Here, an angle of beam of light is smaller just after it passes through the lens group 151 than just after it passes through the lens group 152.

Therefore, if the PBS 192 is disposed between the lens group 151 and lens group 152, a higher optical quenching ratio can be achieved than when it is disposed between the lens group 152 and reflection type SLM 16, so that an accurate processing result is obtained.

Further, because the final lens group 15 of the Fourier transformation lens group 15 acts as the first lens group of the reversed Fourier transformation lens group 17, the number of the lens elements necessary for the optical information processing apparatus can be reduced.

Table 6 below shows lens data of example 6.

TABLE 6

| Plane number | Curvature radius | Plane interval | Refractive index |
|---|---|---|---|
| FF: | ∞ | 0 | |
| 1: | ∞ | 0.532 | |
| 2: | 0.591 | 0.086 | 1.513 |
| 3: | −0.684 | 0.100 | 1.640 |
| 4: | 15.369 | 0.192 | |
| 5: | ∞ | 0.250 | 1.513 |
| 6: | ∞ | 0.237 | |
| 7: | 0.736 | 0.025 | 1.513 |
| 8: | −0.337 | 0.008 | 1.640 |
| 9 | −1.834 | 0.500 | |
| 10: | ∞ | −0.500 | reflection surface |
| 11: | −1.834 | −0.008 | 1.640 |
| 12: | −0.334 | −0.025 | 1.513 |
| 13: | 0.736 | −0.237 | |
| 14: | ∞ | −0.125 | 1.513 |
| 15: | ∞ | 0.125 | reflection surface (45°) |
| 16: | ∞ | 0.192 | |
| 17: | −15.369 | 0.100 | 1.640 |
| 18: | 0.684 | 0.086 | 1.513 |
| 19: | −0.591 | 0.532 | |
| IFB: | ∞ | 0 | |

Example 7

This example 7 is an example for realizing the aforementioned fourth embodiment.

Figure 13:
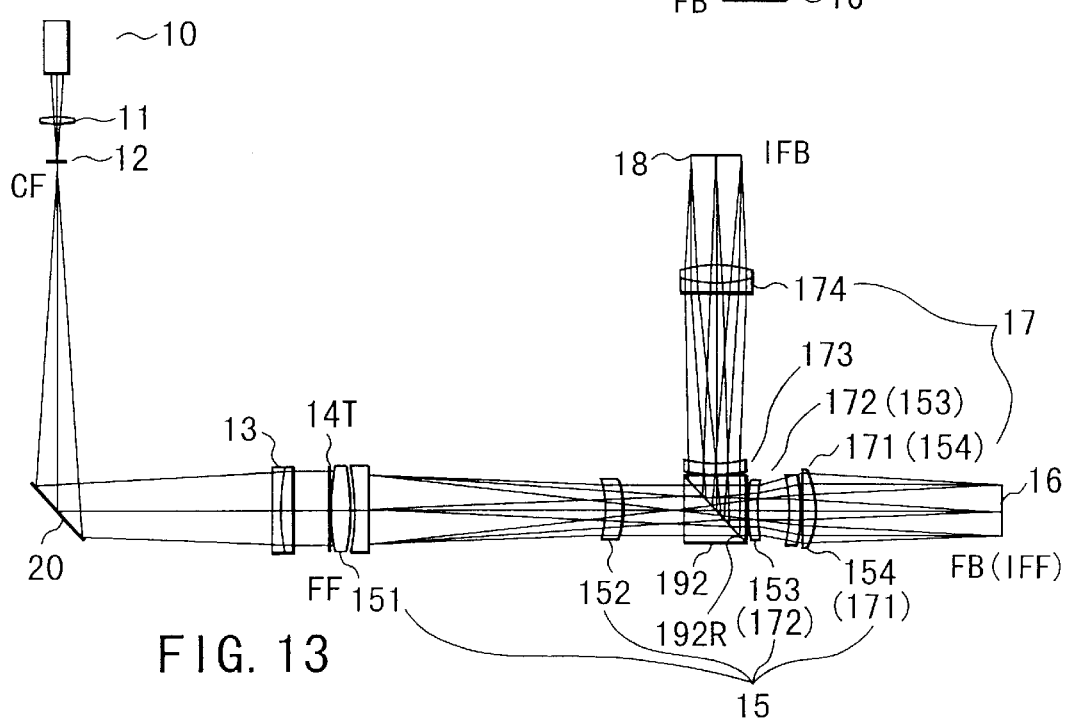
FIG. 13 is a diagram for explaining example 7 of the present invention.

FIG. 13 shows an optical information processing apparatus of example 7.

Beam of light emitted from a coherent light source 10 is focused on a spatial filter 12 disposed on the front focal plane CF of a collimator lens group 13 by a condensing lens 11 so as to remove disturbance components of the wave surface.

This beam of light passing through the spatial filter 12 impinges upon the collimator lens group 13 to turn to collimator light.

In FIG. 13, optical axis is bent at 90° by a mirror 20 so as to prevent an elongation of the entire optical system in one direction.

The aforementioned collimator light impinges upon the transmission type SLM 14T so as to read information of the input image 141 (see FIG. 20).

At this time, beam of light having information of the input image 141 is modulated to P-polarized light in the transmission type SLM 14T.

Consequently, beam of light having information of the input image 141 is not reflected by the reflection surface 192R of the PBS 192 but forms the Fourier transformation image 161 (see FIG. 20) of the input image 141 on the reflection type SLM 16 disposed near the rear focal plane FB of the Fourier transformation lens group 15.

Then, filtering is carried out by the filter 162 displayed on the reflection type SLM 16 at the time of reflection and then, a processing result image 181 (see FIG. 20) is obtained on an image pickup device 18 by the reversed Fourier transformation lens group 17.

At this time, the beam of light of the processing result image 181 is modulated to S-polarized light at the time of reflection by the reflection type SLM 16 so that it is reflected by the reflection surface 192R of the PBS 192.

Here, the Fourier transformation lens group 15 is comprised of four lens groups designated by reference numerals 151, 152, 153, 154.

The reversed Fourier transformation lens group 17 is also composed of four lens groups designated by reference numerals 171, 172, 173, 174.

Because the PBS 192 is disposed between the lens groups 152 and 153 of the Fourier transformation lens group 15, the lens groups 153, 154 of the Fourier transformation lens group 15 act as lens groups 172, 171 of the reversed Fourier transformation lens group 17.

As a result, although if the Fourier transformation lens group 15 and the reversed Fourier transformation lens group 17 are composed of four groups, respectively, and the polarized beam splitter 192 is disposed between a final lens group 154 of the Fourier transformation lens group 15 and the reflection type SLM 16, totally eight lens groups are necessary, the number of the lens elements can be reduced by two lens groups which are used in common.

Beam of light between the lens groups 152 and 153 of the Fourier transformation lens group 15 has a small angle relative to optical axis than beam of light between the lens group 154 and reflection type SLM 16.

Thus, the PBS 192 acts at a higher optical quenching ratio than a case where it is disposed between the final lens group 154 and reflection type SLM 16. Therefore, a higher accuracy filtering can be achieved.

Table 7 below shows lens data of example 7.

TABLE 7

| Plane number | Curvature radius | Plane interval | Refractive index |
|---|---|---|---|
| FF: | ∞ | 0 | |
| 1: | ∞ | 0.004 | |
| 2: | 0.297 | 0.027 | 1.507 |
| 3: | −0.475 | 0.007 | |
| 4: | −0.462 | 0.022 | 1.665 |
| 5: | −4.514 | 0.348 | |
| 6: | −0.160 | 0.026 | 1.741 |
| 7: | −0.220 | 0.089 | |
| 8: | ∞ | 0.092 | 1.531 |
| 9: | ∞ | 0.004 | |
| 10: | 0.685 | 0.011 | 1.610 |
| 11: | 0.144 | 0.047 | |
| 12: | −0.100 | 0.014 | 1.741 |
| 13: | −0.131 | 0.004 | |
| 14: | 0.507 | 0.020 | 1.646 |
| 15: | −0.159 | 0.269 | |
| 16: | ∞ | −0.269 | reflection surface |
| 17: | −0.159 | −0.020 | 1.646 |
| 18: | 0.507 | −0.004 | |
| 19: | −0.131 | −0.014 | 1.741 |
| 20: | −0.100 | −0.047 | |
| 21: | 0.114 | −0.011 | 1.610 |
| 22: | 0.685 | −0.004 | |
| 23: | ∞ | −0.046 | 1.513 |
| 24: | ∞ | 0.046 | reflection surface (45°) 1.513 |
| 25: | ∞ | 0.004 | |
| 26: | 0.170 | 0.011 | 1.484 |
| 27: | 0.135 | 0.245 | |
| 28: | 2.308 | 0.018 | 1.610 |
| 29: | 0.459 | 0.004 | |
| 30: | 0.491 | 0.018 | 1.536 |
| 31: | −0.290 | 0.162 | 1.610 |
| IFB: | ∞ | 0 | |

Example 8

This example 8 shows an example for realizing the aforementioned fourth to sixth embodiments.

In this case, the size of the input image 141 to be displayed on the reflection type SLM 14R for use is 2r=19.55 mm and the pixel size of the reflection type SLM 16 is $d_2$=13.5 μm.

A focal distance $f_{FL}$ of the Fourier transformation lens group 15 which satisfies the equations (1), (2) is obtained. As a result, the focal distance may be 272.44 mm or more as shown in FIG. 14.

Figure 14:
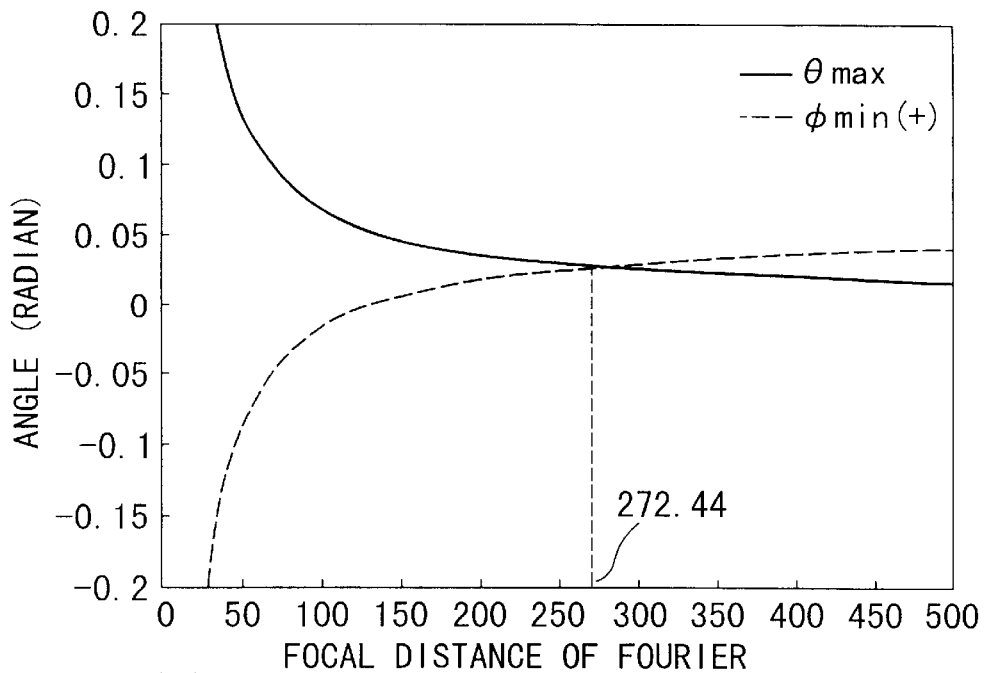
FIG. 14 is a graph for obtaining a focal distance of Fourier transformation lens group 15 for use in example 8 of the present invention.

FIG. 14 shows only cases of θmin (+) and θmax.

Because beam of light focused on the reflection type SLM 16 shown in FIG. 11 is symmetrical relative to main light CC', θmax(−) and θmin have the same result as θmin(+) and θmax. Therefore, cases of θmax(−) and θmin are omitted in FIG. 14.

Figure 15:
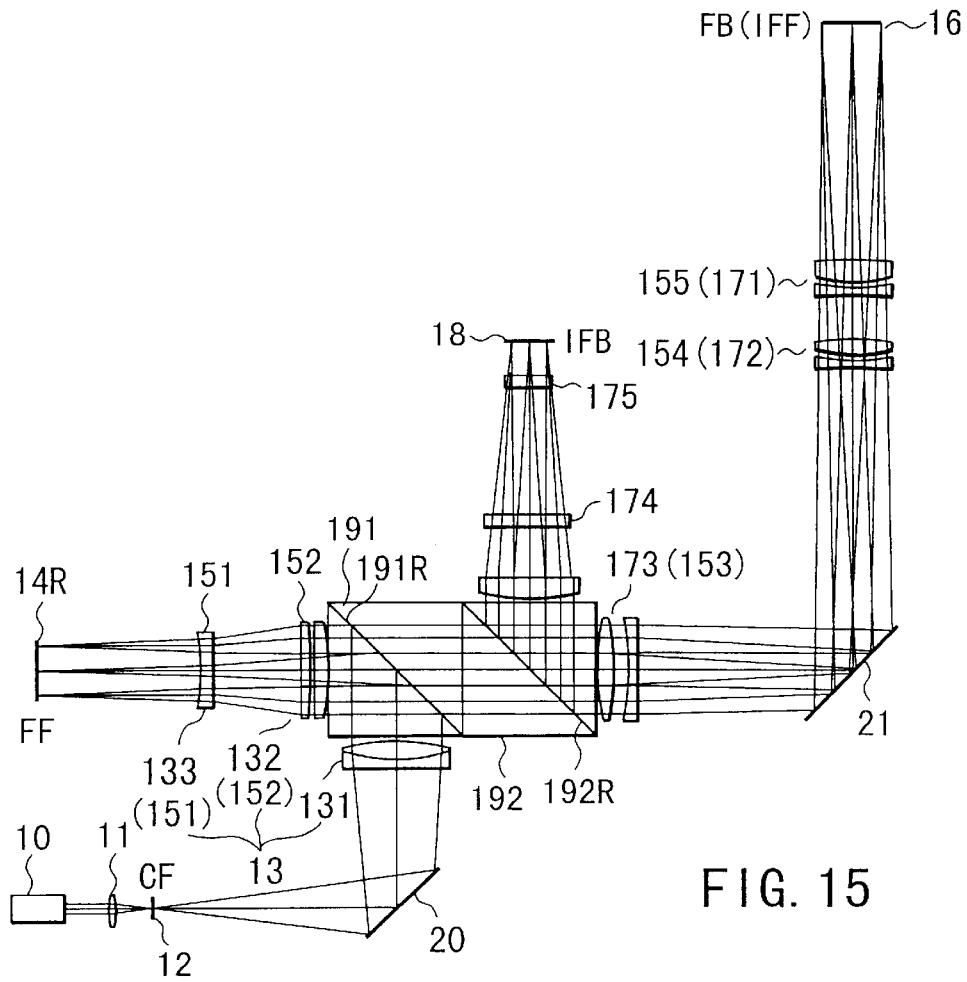
FIG. 15 is a diagram for explaining example 8 of the present invention.
Figure 16:
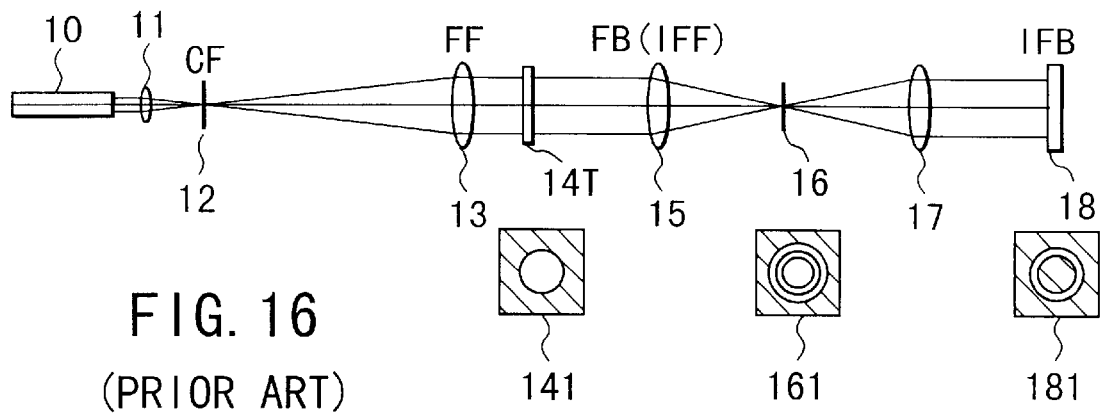
FIG. 16 is a diagram showing a structure of most general optical information processing apparatus optical system based on a conventional art.
Figure 17:
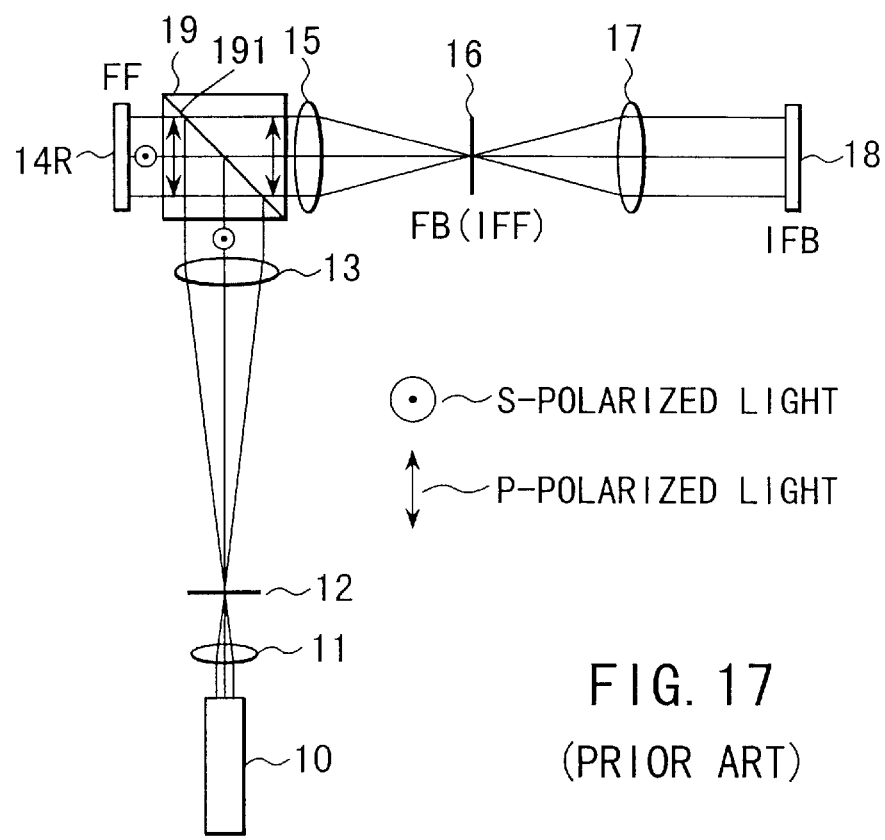
FIG. 17 is a diagram showing a structure of a conventional optical information processing apparatus optical system in case where an input image is displayed on a reflection type spatial light modulator.
Figure 18:
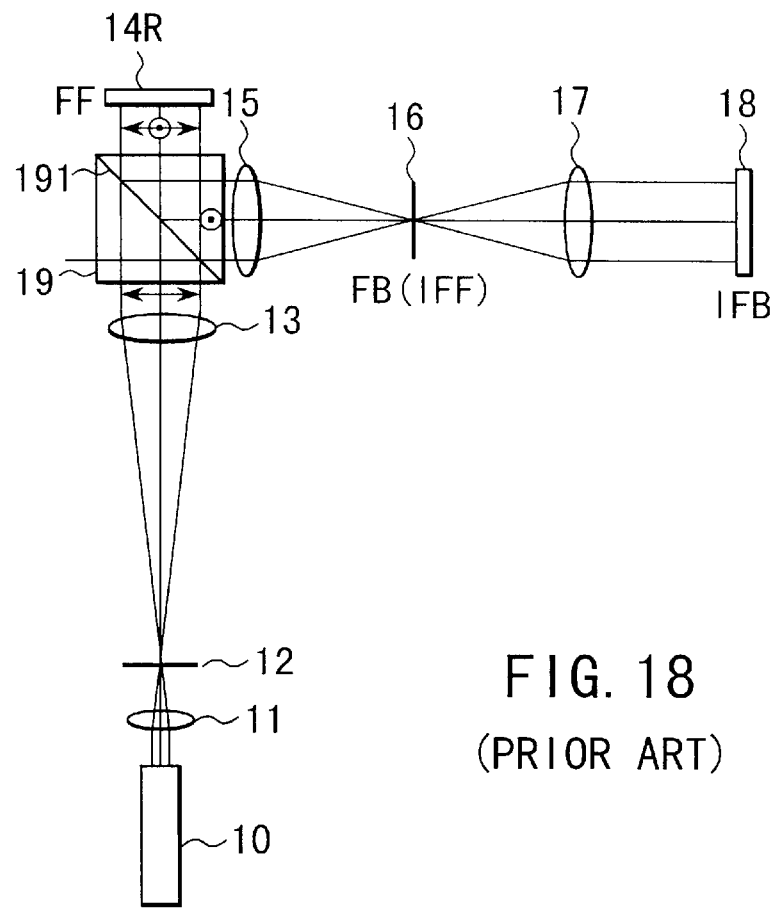
FIG. 18 is a diagram showing a structure of a conventional optical information processing apparatus optical system in case where an input image is displayed on a reflection type spatial light modulator.
Figure 19:
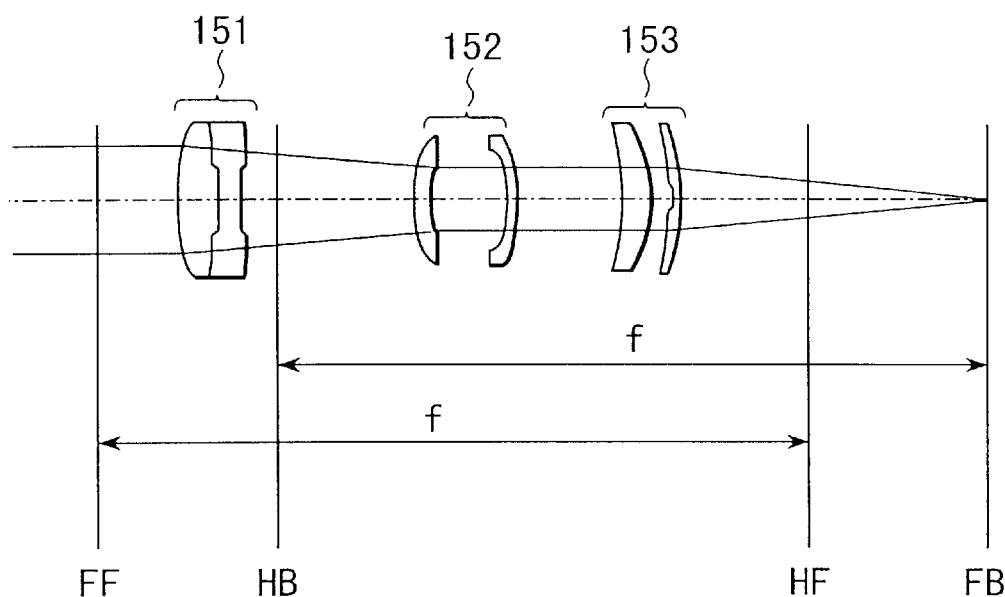
FIG. 19 is a diagram showing an example of design of Fourier transformation lens group comprised of three groups in which power is distributed to positive, negative and positive, for use in a conventional optical information processing apparatus optical system.

FIG. 15 shows an optical information processing apparatus of example 8 employing the Fourier transformation lens group 15 which eliminates an influence of diffraction of the reflection type SLM 16 obtained in the above manner.

Beam of light emitted from a coherent light source 10 is focused on a spatial filter 12 disposed on the front focal plane CF of a collimator lens group 13 by a condensing lens 11 so as to remove disturbance components of the wave surface.

Beam of light passing through the spatial filter 12 is modulated to S-polarized light so as to be reflected by the reflection surface 191R of the PBS 191.

Next, collimator light passing through the collimator lens group 13 impinges upon the reflection type SLM 14R so as to read the input image 141 (see FIG. 20).

Because the reflection type SLM 14R modulates information of the input image 141 to P-polarized light, reflection light from the reflection type SLM 14R is not reflected by the PBSs 191, 192, but forms a Fourier transformation image 162 (see FIG. 20) on the image pickup device 18 disposed near the FF plane.

First lens group 151 and second lens group 152 of the Fourier transformation lens group 15 are common to second lens group 133 and third lens group 132 of the collimator lens group 13.

Further, lens groups 153, 154, 155 of the Fourier transformation lens group 15 function as lens groups 173, 172, 171 of the reversed Fourier transformation lens group 17.

As a result, the number of the lens groups can be reduced as compared to a case where the collimator lens group 13, Fourier transformation lens group 15 and reversed Fourier transformation lens group 17 are prepared independently.

The Fourier transformation lens group 15 has a function similar to afocal system while the first lens group 151 has a negative power and the second lens group has a positive power to widen the width of beam of light. Therefore, the angle of diffracted light from the reflection type SLM 14R with respect to optical axis decreases after it passes through the lens groups 151, 152 and finally impinges upon the PBS 191.

As a result, the incident angle of beam of light to the reflection surface 191R of the PBS 191 decreases. Therefore, as compared to the conventional case where the PBS is disposed between the reflection type SLM 14R and the first lens group of the Fourier transformation lens group 15, it functions at a higher optical quenching ratio so that an accurate filtering can be achieved.

Further, the PBS 192 also functions with an excellent polarization characteristic.

In FIG. 15, optical axis is bent at 90° by the mirrors 20, 21 so as to prevent an elongation of the entire optical system in one direction.

Table 8 below shows lens data of example 8.

TABLE 8

| Plane number | Curvature radius | Thickness | Refractive index |
|---|---|---|---|
| FF: | ∞ | 0 | |
| 1: | ∞ | 0.230 | |
| 2: | −0.315 | 0.000 | 1.501 |
| 3: | −24.687 | 0.126 | |
| 4: | −7.329 | 0.012 | 1.665 |
| 5: | −1.014 | 0.01 | |
| 6: | −1.171 | 0.014 | 1.516 |
| 7: | −0.446 | 0.004 | |
| 8: | ∞ | 0.184 | 1.513 |
| 9: | ∞ | 0.004 | |
| 10: | ∞ | 0.184 | 1.513 |
| 11: | ∞ | 0.004 | |
| 12: | 1.051 | 0.020 | 1.491 |
| 13: | −0.343 | 0.022 | |
| 14: | −0.323 | 0.011 | 1.749 |
| 15: | −0.593 | 0.367 | |
| 16: | ∞ | −0.342 | reflection surface (45°) |
| 17: | −0.500 | −0.011 | 1.628 |
| 18: | 0.141 | −0.007 | |
| 19: | 0.128 | −0.022 | 1.491 |
| 20: | −0.411 | −0.056 | |
| 21: | −0.426 | −0.011 | 1.487 |
| 22: | 0.098 | −0.005 | |
| 23: | 0.109 | −0.037 | 1.505 |
| 24: | −0.286 | −0.327 | |
| 25: | ∞ | 0.327 | reflection surface |
| 26: | −0.286 | 0.037 | 1.505 |
| 27: | 0.109 | 0.005 | |
| 28: | 0.098 | 0.011 | 1.487 |
| 29: | −0.426 | 0.056 | |
| 30: | −0.411 | 0.022 | 1.491 |
| 31: | 0.128 | 0.007 | |
| 32: | 0.141 | 0.011 | 1.628 |
| 33: | −0.500 | 0.342 | |
| 34: | ∞ | −0.367 | reflection surface (45°) |
| 35: | −0.593 | −0.011 | 1.749 |
| 36: | −0.323 | −0.022 | |
| 37: | −0.343 | −0.020 | 1.491 |
| 38: | 1.051 | −0.004 | |
| 39: | ∞ | −0.092 | 1.513 |
| 40: | ∞ | 0.092 | reflection surface (45°) 1.513 |
| 41: | ∞ | 0.007 | |
| 42: | 0.395 | 0.026 | 1.623 |
| 43: | 1.508 | 0.071 | |
| 44: | 0.763 | 0.019 | 1.733 |
| 45: | 3.551 | 0.176 | |
| 46: | −1.302 | 0.014 | 1.755 |
| 47: | 0.265 | 0.047 | |
| IFB: | ∞ | 0 | |

As described above, according to the fourth to sixth embodiments of the present invention, it is possible to provide an optical information processing apparatus capable of, if the reflection type SLM is used for filter display, carrying out various optical information processings such as correlation, convolution and filtering to a large volume images at a high precision and in which necessary components thereof can be reduced in number.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical information processing apparatus comprising:

a coherent light source;

a collimator optical system for collimating light from the coherent light source;

a reflection type spatial light modulator for modulating the collimated light from the collimator optical system and for reflecting the modulated light; and a Fourier transformation optical system for Fourier-transforming light from the reflection type spatial light modulator and sharing at least a part of optical system with the collimator optical system.

2. An optical information processing apparatus according to claim 1, further comprising an optical beam splitter for splitting an optical path of the light traveling to the reflection type spatial light modulator and an optical path of the light returned from the reflection type spatial light modulator at a predetermined position.

3. An optical information processing apparatus comprising:

a coherent light source;

a collimator optical system for collimating light from the coherent light source;

a reflection type spatial light modulator for modulating the collimated light from the collimator optical system, and for reflecting the modulated light;

a Fourier transformation optical system for Fourier-transforming light from the reflection type spatial light modulator and sharing at least part of an optical system with the collimated optical system; and a polarized beam splitter disposed in an optical path between a lens which contains the exit surface of the light in the collimator optical system and a lens which contains the exit surface of the light in the Fourier transformation optical system.

4. An optical information processing apparatus comprising:

a coherent light source;

a polarized beam splitter on which light from the coherent light source impinges;

an optical lens system on which light from the polarized beam splitter impinges; and a reflection type spatial light modulator on which light from the optical lens system impinges, wherein the light reflected by the reflection type spatial light modulator impinges upon the polarized beam splitter through the optical lens system, and the optical lens system has a function for collimating light from the coherent light source to the reflection type spatial light modulator and a function for Fourier-transforming light reflected by the reflection type spatial light modulator.

5. An optical information processing apparatus comprising:

a coherent light source;

a polarized beam splitter;

a first optical lens system;

a reflection type spatial light modulator; and a section optical lens system, wherein the light generated by the coherent light source travels to the reflection type spatial modulator through the polarized beam splitter and the first optical lens in this order is reflected on the reflection type spatial modulator and travels to the second lens system through the first optical lens system and the polarized beam splitter in this order, the first optical lens system collimates the light from the coherent light source to the reflection type spatial light modulator, and the first optical lens system and the second optical lens system cooperatively perform Fourier transform of the light reflected on the reflection type spatial light modulator.

6. An optical information processing apparatus comprising:
- a coherent light source;
- a polarized beam splitter;
- an optical lens system; and
- a reflection type spatial light modulator,
- wherein the light generated by the coherent light source travels to the reflection type spatial modulator through the polarized beam splitter and the optical lens in this order, is reflected on the reflection type spatial modulator, and travels to the polarized beam splitter through the optical lens system, and
- the optical lens system collimates the light from the coherent light source to the reflection type spatial light modulator, and Fourier transforms the light reflected on the reflection type spatial light modulator.

7. An optical information processing apparatus according to claim 6, further comprising a reflection surface provided in the optical path between the coherent light source and the polarized beam splitter.

8. An optical information processing apparatus comprising:
- a coherent light source;
- a first optical lens system;
- a polarized beam splitter;
- a second optical lens system;
- a reflection type spatial light modulator; and
- a third optical lens system,
- wherein the light generated by the coherent light source travels to the reflection type spatial modulator through the first optical lens system and the polarized beam splitter and the second optical lens in this order, is reflected on the reflection type spatial modulator, and travels to the third optical lens system through the second optical lens system and the polarized beam splitter in this order,
- the first optical lens system and the second optical lens system cooperatively collimate the light from the coherent light source to the reflection type spatial light modulator, and
- the second optical lens system and the third optical lens system cooperatively perform Fourier transform of the light reflected on the reflection type spatial light modulator.

9. An optical information processing apparatus according to claim 8, further comprising a reflection surface provided in the optical path between the coherent light source and the polarized beam splitter.

10. An optical information processing apparatus comprising:
- a coherent light source;
- a polarized beam splitter;
- an optical lens system; and
- a reflection type spatial light modulator,
- wherein the light generated by the coherent light source travels to the reflection type spatial modulator through the polarized beam splitter and the optical lens system in this order is reflected on the reflection type spatial modulator, and travels to the polarized beam splitter through the optical lens system, and
- the optical lens system is at least part of Fourier transformation optical system and is at least part of Fourier inverse transformation optical system.

11. An optical information processing apparatus comprising:
- a coherent light source;
- a polarized beam splitter;
- an afocal lens system; and
- a reflection type spatial light modulator,
- wherein the light generated by the coherent light source travels to the reflection type spatial modulator through the polarized beam splitter and the afocal optical lens system in this order, is reflected on the reflection type spatial modulator, and travels to the polarized beam splitter through the afocal optical lens system, and
- the afocal optical system narrows the light flux traveling to the reflection type spatial light modulator.

12. An optical information processing apparatus comprising:
- a coherent light source;
- a polarized beam splitter; and
- a reflection type spatial light modulator,
- wherein the light generated by the coherent light source travels to the reflection type spatial modulator through the polarized beam splitter, is reflected on the reflection type spatial modulator, and travels to the polarized beam splitter and
- the optical information processing apparatus is constructed so that, in the light reflected on the reflection type spatial light modulator, the 0-th order diffracted light component and the ±1st order diffracted light components do not spatially overlap each other.

13. An optical information processing apparatus comprising:
- a coherent light source;
- a collimator optical system;
- a spatial light modulator for displaying an input image;
- a polarized beam splitter;
- an optical system; and
- a reflection type spatial light modulator for filtering light,
- the optical information processing apparatus being so constructed that the light generated by the coherent light source travels to the reflection type spatial modulator through the collimator optical system and the spatial light modulator and the polarized beam splitter and the optical system, is reflected on the reflection type spatial light modulator and travels to the polarized beam splitter through the optical system,
- wherein the optical system is at least part of Fourier transformation optical system and is at least part of Fourier inverse transformation optical system.

14. An optical information processing apparatus according to claim 13, further comprising a second optical system provided in the optical path between the spatial light modulator and the polarized beam splitter being part of Fourier transformation optical system in which the optical system is included.

15. An optical information processing apparatus according to claim 13, further comprising a third optical system provided in the optical path of the reflected light traveling out of the polarized beam splitter being part of Fourier inverse transformation optical system in which the optical system is included.

16. An optical information processing apparatus comprising:
- a coherent light source;
- a polarized beam splitter;
- an afocal optical lens system; and
- a reflection type spatial light modulator for displaying an input image,
- wherein the light generated by the coherent light source travels to the reflection type spatial modulator through the polarized beam splitter and the afocal optical lens system in this order, is reflected on the reflection type spatial modulator, and travels to the polarized beam splitter through the afocal optical lens system, and
- the afocal optical system narrows the light flux traveling to the reflection type spatial light modulator.

17. An optical information processing apparatus according to claim 16, wherein the afocal optical system is at least part of the collimator optical system collimating the light from the coherent light source, and is at least part of the Fourier transformation optical system Fourier transforming the light reflected on the reflection type spatial light modulator.

18. An optical information processing apparatus comprising:
- a coherent light source;
- a polarized beam splitter; and
- a reflection type spatial light modulator for displaying an input image,
- wherein the light generated by the coherent light source travels to the reflection type spatial modulator through the polarized beam splitter, is reflected on the reflection type spatial modulator, and travels to the polarized beam splitter, and
- the optical information processing apparatus is constructed so that in the light reflected on the reflection type spatial light modulator, the 0-th order diffracted light component and the ±1st order diffracted light components do not spatially overlap each other.

19. An optical information processing apparatus comprising:
- a coherent light source;
- a collimator optical system for collimating light from the coherent light source;
- a spatial light modulator for displaying an input image and for modulating light from the collimator optical system;
- a Fourier transformation lens group comprised of at least two lenses for carrying out Fourier transformation of light from the spatial light modulator;
- a polarized beam splitter provided in the optical path between the coherent light source and the last lens of the Fourier transformation lens group;
- a reflection type spatial light modulator for filtering a Fourier transformation image obtained by the Fourier transformation lens group; and
- a Fourier inverse transformation lens group including at least the last lens of the Fourier transformation lens as a common optical lens, for Fourier inverse transformation of light from the reflection type spatial light modulator.

20. An optical information processing apparatus according to claim 19, wherein the following equations (1), (2) are satisfied:

$$\phi min(+) > \theta max \quad (1)$$

$$\phi max(-) < \theta min \quad (2)$$

where θmax and θmin indicate maximum angle and minimum angle when beam of light of the same frequency component of diffracted light generated from the spatial light modulator are focused after passing through the Fourier transformation lens group and φmin(+) and φmax(−) indicate angles of +1 order diffracted light of θmin and −1 order diffracted light of θmax with respect to optical axis.

21. An optical information processing apparatus according to claim 19, wherein first and second lens groups of the Fourier transformation lens group are disposed between the spatial light modulator for displaying the input image and the polarized beam splitter and function as afocal system.

22. An optical information processing apparatus according to claim 19, wherein first and second lens groups of the Fourier transformation lens group have negative and positive powers respectively and are disposed between the spatial light modulator for displaying the input image and the polarized beam splitter so that they function as afocal system.

23. An optical information processing apparatus comprising:
- a coherent light source;
- a collimator lens group for collimating light from the coherent light source;
- Fourier transformation lens group comprised of three or more lens groups for carrying our Fourier transformation of light from the spatial light modulator;
- a reflection type spatial light modulator for filtering a Fourier transformation image obtained by the Fourier transformation lens group;
- a Fourier inverse transformation lens group; and
- first and second polarized beam splitters,
- wherein the first polarized beam splitter is disposed between the first lens group and final lens group of the collimator lens group so that entire or partial lens group of the collimator lens group functions as a lens group of the Fourier transformation lens group, and
- the second polarized beam splitter is disposed on the incident light side with respect to the final lens group of the Fourier transformation lens group so that the final lens group of the Fourier transformation lens group functions as entire or partial lens group of the Fourier inverse transformation lens group.

24. An optical information processing apparatus according to claim 22, wherein the following equations (1), (2) are satisfied:

$$\phi min(+) > \theta max \quad (1)$$

$$\phi max(-) < \theta min \quad (2)$$

where θmax and θmin indicate maximum angle and minimum angle when beam of light of the same frequency component of diffracted light generated from the spatial light modulator are focused after passing through the Fourier transformation lens group and φmin(+) and φmax(−) indicate angles of +1 order diffracted light of θmin and −1 order diffracted light of θmax with respect to optical axis.

25. An optical information processing apparatus according to claim 22, wherein first and second lens groups of the Fourier transformation lens group are disposed between the spatial light modulator for displaying the input image and the polarized beam splitter and function as afocal system.

26. An optical information processing apparatus according to claim 22, wherein first and second lens groups of the Fourier transformation lens group have negative and positive powers respectively and are disposed between the spatial light modulator for displaying the input image and the polarized beam splitter so that they function as afocal system.

* * * * *